United States Patent
Amizur et al.

(10) Patent No.: US 11,119,206 B2
(45) Date of Patent: Sep. 14, 2021

(54) APPARATUS, SYSTEM AND METHOD OF COLLABORATIVE TIME OF ARRIVAL (CTOA) MEASUREMENT

(71) Applicant: INTEL CORPORATION, Santa Clara, CA (US)

(72) Inventors: Yuval Amizur, Kfar-Saba (IL); Ofer Bar-Shalom, Kiryat Ono (IL); Leor Banin, Petach Tikva (IL); Nir Dvorecki, Herzeliya (IL)

(73) Assignee: INTEL CORPORATION, Santa Clara, CA (US)

( * ) Notice: Subject to any disclaimer, the term of this patent is extended or adjusted under 35 U.S.C. 154(b) by 184 days.

(21) Appl. No.: 16/232,098

(22) Filed: Dec. 26, 2018

(65) Prior Publication Data
US 2020/0209383 A1 Jul. 2, 2020

(51) Int. Cl.
*G01S 13/76* (2006.01)
*H04W 64/00* (2009.01)

(52) U.S. Cl.
CPC .......... *G01S 13/765* (2013.01); *H04W 64/00* (2013.01); *H04W 64/003* (2013.01)

(58) Field of Classification Search
CPC .... G01S 13/765; H04W 64/003; H04W 64/00
See application file for complete search history.

(56) References Cited

U.S. PATENT DOCUMENTS

| | | | | |
|---|---|---|---|---|
| 2014/0010211 | A1* | 1/2014 | Asterjadhi | H04W 72/0446 370/336 |
| 2014/0233478 | A1* | 8/2014 | Wentink | H04L 1/1854 370/329 |
| 2015/0063128 | A1* | 3/2015 | Garikipati | H04B 7/0452 370/252 |
| 2016/0295630 | A1* | 10/2016 | Gubeskys | H04L 5/0055 |
| 2017/0251449 | A1* | 8/2017 | Malik | H04W 64/003 |

(Continued)

OTHER PUBLICATIONS

Banin, Leor & Bar-Shalom, Ofer & Dvorecki, Nir & Amizur, Yuval. "High-Accuracy Indoor Geolocation using Collaborative Time of Arrival (CToA)". Intel White Paper (Sep. 2017). (Year: 2017).*

(Continued)

*Primary Examiner* — Erin F Heard
*Assistant Examiner* — Thomas M Hammond, III
(74) *Attorney, Agent, or Firm* — Shichrur & Co.

(57) ABSTRACT

Some demonstrative embodiments include apparatuses systems and/or methods of Collaborative Time of Arrival (CToA). For example, an apparatus may include circuitry and logic configured to cause a CToA broadcasting wireless communication station (STA) (bSTA) to broadcast an announcement frame to announce a ranging-to-self sequence of a CToA measurement protocol; to broadcast a first ranging measurement frame of the ranging-to-self sequence subsequent to the announcement frame; to broadcast a second ranging measurement frame of the ranging-to-self sequence subsequent to the first ranging measurement frame; and to broadcast a Location Measurement Report (LMR) frame of the ranging-to-self sequence subsequent to the second ranging measurement frame, the LMR frame including a Time of Departure (ToD) of the first ranging measurement frame.

12 Claims, 10 Drawing Sheets

(56) References Cited

U.S. PATENT DOCUMENTS

| | | | | |
|---|---|---|---|---|
| 2017/0294949 A1* | 10/2017 | Zhang | ............... | H04W 74/0816 |
| 2017/0295004 A1* | 10/2017 | Amizur | ................ | H04L 5/0078 |
| 2018/0063725 A1* | 3/2018 | Elsherif | .............. | H04B 7/0452 |
| 2019/0014491 A1* | 1/2019 | Seok | ....................... | H04L 63/12 |
| 2019/0069267 A1* | 2/2019 | Seok | ..................... | G01S 5/0284 |
| 2019/0305813 A1* | 10/2019 | Zhang | ..................... | H04B 7/04 |
| 2020/0077334 A1* | 3/2020 | Wang | ................ | H04W 52/0229 |

OTHER PUBLICATIONS

Banin et al., "High-Accuracy Indoor Geolocation Using Collaborative Time of Arrival (CToA)", Intel White Paper, Sep. 2017 (Year: 2017).*

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF COLLABORATIVE TIME OF ARRIVAL (CTOA) MEASUREMENT

TECHNICAL FIELD

Embodiments described herein generally relate to Collaborative Time Of Arrival (CToA) measurement.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
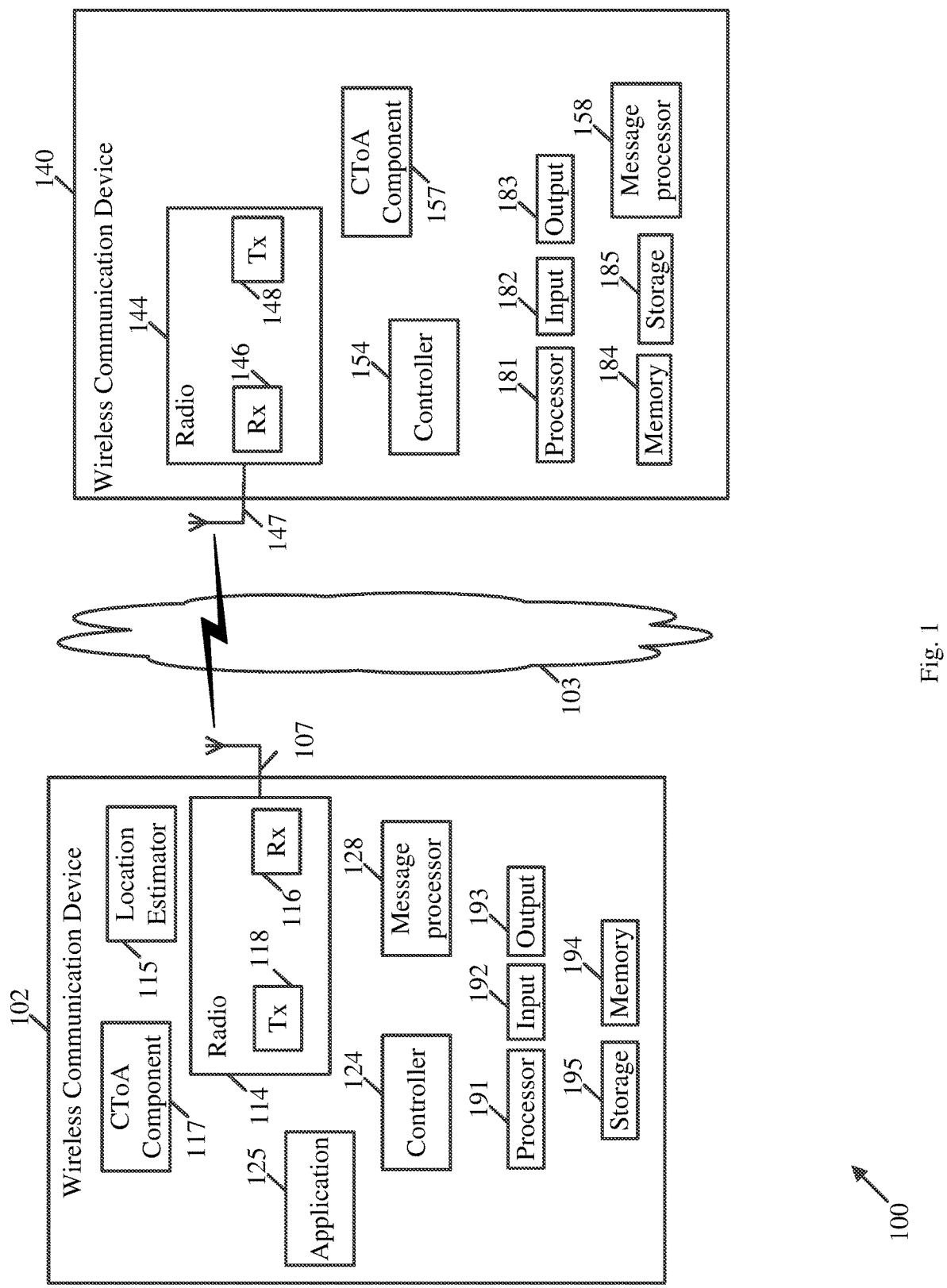
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2016* (*IEEE 802.11-2016, IEEE Standard for Information technology—Telecommunications and information exchange between systems Local and metropolitan area networks—Specific requirements Part* 11: *Wireless LAN Medium Access Control* (*MAC*) *and Physical Layer* (*PHY*) *Specifications, Dec. 7, 2016*); and/or IEEE 802.11az (*IEEE 802.11az, Next Generation Positioning*)) and/or future versions and/or derivatives thereof, devices and/or networks operating in accordance with existing WiFi Alliance (WFA) Specifications (including *Wi-Fi Neighbor Awareness Networking* (NAN) *Technical Specification, Version* 1.0, May 1, 2015) and/or future versions and/or derivatives thereof, devices and/or networks operating in accordance with existing WFA Peer-to-Peer (P2P) specifications (including WiFi P2P technical specification, version 1.5, Aug. 4, 2014) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, devices 102 and/or 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, devices 102 and/or 140 may include, operate as, and/or perform the functionality of an AP STA, and/or one or more of wireless devices 102 and/or 140 may include, operate as, and/or perform the functionality of a non-AP STA. In other embodiments, devices 102 and/or 140 may operate as and/or perform the functionality of any other STA.

For example, the AP may include a router, a PC, a server, a Hot Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102 and/or 140, and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102 and 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102 and 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, devices 102 and/or 140 may include, operate as, perform the role of, and/or perform one or more functionalities of, one or more STAs. For example, device 102 may include at least one STA, and/or device 140 may include at least one STA.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments, devices 102 and/or 140 may be configured to perform a positioning and/or ranging measurement, e.g., as described below.

In some demonstrative embodiments, devices 102 and/or 140 may include one or more applications configured to provide and/or to use one or more location based services, e.g., a social application, a navigation application, a location based advertising application, and/or the like. For example, device 102 may include an application 125 to be executed by device 102.

In some demonstrative embodiments, application 125 may use range information, for example, to determine an estimated location of device 102, e.g., with respect to a coordinate system, e.g., a World Geodetic System 1984 (WGS84), and/or a local coordinate system.

In one example, device 102 may include a Smartphone, which is located in a shop, e.g., in a shopping mall. According to this example, application 125 may use the range information to determine a relative location of device 102, for example, to receive sale offers from the shop.

In another example, device 102 may include a mobile device, which is located in a parking zone, e.g., of a shopping mall. According to this example, application 125 may use the range information to determine a location of device 102 in the parking zone, for example, to enable a user of device 102 to find a parking area in the parking zone.

In some demonstrative embodiments, device 102 may include a location estimator 115 configured to perform one or more positioning measurements to be used to estimate a location of device 102, e.g., as described below.

In some demonstrative embodiments, location estimator 115 may be configured to determine a location of device 102, for example, using a plurality of ranges from a plurality of other STAs, e.g., by performing trilateration.

In some demonstrative embodiments, location estimator 115 may include circuitry and/or logic, e.g., processor circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below.

In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, location estimator 115 may be configured to estimate the location of device 102, for example, based on time based range measurements, for example, with one or more other devices.

In some demonstrative embodiments, the time based range measurements may be performed using WLAN communications, e.g., WiFi. For example, using WiFi to perform the time based range measurements may enable, for example, increasing an indoor location accuracy of the location estimation of device 102, e.g., in an indoor environment.

In some demonstrative embodiments, the time based range measurements may include a Time of Flight (ToF) measurement.

In some demonstrative embodiments, a ToF value may be defined as the overall time a signal propagates from a first station, e.g., device 102, to a second station, e.g., device 140. A distance between the first and second stations may be determined based on the ToF value, for example, by multiplying the ToF value by the speed of light.

In some demonstrative embodiments, the ToF measurement procedure may include a Fine Timing Measurement (FTM) procedure.

In some demonstrative embodiments, the ToF measurement procedure may include a Very High Throughput (VHT) ranging measurement procedure.

In some demonstrative embodiments, the ToF measurement procedure may include a High Efficiency (HE) ranging measurement procedure.

In some demonstrative embodiments, the ToF measurement procedure may include any other positioning measurement.

In some demonstrative embodiments, devices 102 and/or 140 may be configured to perform one or more operations of range measurements, location measurements, and/or positioning measurements, e.g., as described below.

In some demonstrative embodiments, devices 102 and/or 140 may be configured to perform one or more positioning measurements, for example, which may be implemented, for example, in accordance with a Next-Generation Positioning (NGS) Task Group (TG), e.g., in accordance with a future IEEE 802.11az Specification, for example, to provide a technical advantage of improved scalability.

In some demonstrative embodiments, devices 102 and/or 140 may be configured to operate as part of a geolocation system, which may operate, for example, indoor or outdoor, and/or may provide support to a large number, e.g., even an infinite capacity of, users, e.g., similar to a capacity of GNSS systems.

In some demonstrative embodiments, the geolocation system may be able to augment GNSS receivers, for example, in situations where not enough satellites are visible, such that a GNSS receiver may not be able to provide a position fix estimate. For example, with an aid of the geolocation system, a fix of the GNSS receiver can be determined.

In some demonstrative embodiments, devices 102 and/or 140 may be configured to perform one or more positioning measurements, for example, according to a Collaborative Time of Arrival (CToA) positioning mechanism, e.g., as described below.

In some demonstrative embodiments, devices 102 and/or 140 may be configured to perform one or more positioning measurements and/or communications, for example, according to a CToA positioning mechanism, one or more FTM measurements, ToF measurements, positioning measurements and/or communications, ranging measurements and/or communications, proximity measurements and/or communications, location estimation measurements and/or communications.

In some demonstrative embodiments, devices 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to CToA positioning measurements according to a CToA protocol. However, other embodiments may be implemented with respect to any other additional or alternative positioning measurements and/or communications, ranging measurements and/or communications, proximity measurements and/or communications, location estimation measurements and/or communications.

In some demonstrative embodiments, devices 102 and/or 140 may be configured to perform one or more positioning measurements and/or communications, for example, according to the CToA positioning mechanism, for example, using WLAN communications, e.g., WiFi. For example, using WiFi to perform time based range measurements, may enable, for example, increasing an indoor location accuracy of the mobile devices, e.g., in an indoor environment.

In other embodiments, any other additional and/or alternative wireless communication technology may be used.

In some demonstrative embodiments, device 102 may include a CToA component 117, and/or device 140 may include a CToA component 157, which may be configured to perform one or more CToA measurements, operations and/or communications, e.g., as described below.

In some demonstrative embodiments, CToA components 117 and/or 157 may be configured to perform one or more operations and/or communications of a CToA protocol. In other embodiments, CToA components 117 and/or 157 may be configured to perform one or more operations and/or communications of any other positioning measurement.

In some demonstrative embodiments, CToA components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of CToA components 117 and/or 157. Additionally or alternatively, one or more functionalities of CToA components 117 and/or 157 may be implemented by logic, which may be executed by a machine and/or one or more processors, e.g., as described below.

In some demonstrative embodiments, CToA component 117 may be configured to perform one or more operations of, and/or at least part of the functionality of, message processor 128 and/or controller 124, for example, to trigger communication of one or more ranging messages and/or positioning packets, for example, sounding signals and/or Null Data Packets (NDPs), e.g., as described below.

In some demonstrative embodiments, CToA component 157 may be configured to perform one or more operations of, and/or at least part of the functionality of, message processor 158 and/or controller 154, for example, to trigger communication of one or more ranging messages and/or positioning packets, for example, sounding signals and/or NDPs, e.g., as described below.

In some demonstrative embodiments, CToA components 117 and/or 157 may be configured to trigger ranging transmissions and/or measurements, for example, periodically and/or or upon a request from an application executed by a device, for example, to determine an accurate location of the device.

In some demonstrative embodiments, CToA components 117 and/or 157 may be configured to perform one or more measurements according to the CToA positioning mechanism, e.g., as described below.

In some demonstrative embodiments, CToA components 117 and/or 157 may be configured to perform one or more proximity, ranging, and/or location estimation measurements, e.g., in an indoor location, based on the CToA protocol. For example, the CToA positioning mechanism may provide a relatively accurate estimation of location, range and/or proximity, e.g., in an indoor location.

Some demonstrative embodiments are described herein with respect to a positioning component, e.g., CToA components 117 and/or 157, configured to perform measurements according to the CToA protocol and/or procedure. However, in other embodiments, the positioning component may be configured to perform any other additional or alternative type of Time of Flight (ToF) measurements, VHT ranging measurements, HE ranging measurements, ranging measurements, positioning measurements, proximity measurements, and/or location estimation measurements, e.g., according to any additional or alternative protocol and/or procedure.

In some demonstrative embodiments, devices 102 and/or 140 may be configured to perform one or more positioning measurements, for example, according to the CToA protocol, e.g., as described below.

In one example, a CToA protocol may be a next generation, indoor geolocation protocol, which may be designed, for example, for enabling scalability of existing IEEE 802.11/Wi-Fi-based, geolocation systems. The CToA protocol may leverage on an IEEE802.11 FTM capabilities, may be enabled in Wi-Fi chipsets, and/or may support two concurrent operation modes, e.g., as described below.

In some demonstrative embodiments, a CToA network may include one or more CToA broadcasting STAs (bSTA), which may be allowed to be independent and/or unsynchronized. In one example, device 140 may be configured to operate as, perform a role of, and/or perform one or more functionalities of, a bSTA, e.g., as described below.

In some demonstrative embodiments, a bSTA, e.g., device 140 may include an AP STA or a non-AP station.

In some demonstrative embodiments, the CToA network may include one or more CToA client STA (cSTA).

In some demonstrative embodiments, device 102 may be configured to operate as, perform a role of, and/or perform one or more functionalities of, a cSTA, e.g., as described below.

In other embodiments, device 102 may be configured to operate as, perform a role of, and/or perform one or more functionalities of, a bSTA, e.g., as described below.

In one example, the CToA protocol may include a broadcast-based protocol, which may operate over an un-managed network, and may be built, for example, out of unsynchronized units called "CToA broadcasting stations" (bSTAs). For example, the CToA protocol may support implementing one or more cheap bSTA. The bSTAs may be stationed at known locations, which may periodically broadcast a beacon transmission, e.g., a unique beacon transmission, and may publish its Time Of Departure (ToD). Neighbor bSTAs and clients that receive the beacon transmission, may measure and log its time of arrival (ToA). In one example, every bSTA may publish its most recent timing measurement log as part of its next beacon transmission.

In some demonstrative embodiments, devices 102 and/or 140 may be configured to support a ranging-to-self measurement sequence, e.g., as described below.

In some demonstrative embodiments, the ranging-to-self measurement sequence may support a bSTA, e.g., device 140, to broadcast a measurement frame to enable timing measurements by a neighbor STA, for example, device 102, e.g., a cSTA or a neighbor bSTA.

In some demonstrative embodiments, the ranging-to-self measurement sequence may be configured to reuse, e.g., even completely reuse, one or more Very-High-Throughput (VHT) Task Group az (TGaz) (VHTz) Single-User (SU) frame formats and/or sequences, e.g., as described below.

In some demonstrative embodiments, the ranging-to-self measurement sequence may be defined to include at least part of a VHTz SU frame format, e.g., as described below.

In some demonstrative embodiments, the ranging-to-self measurement sequence may support APs and/or VHTz-SU capable responder devices to become CToA-capable, for example, by broadcasting a "Ranging-to-Self" sequence, in which they may act as an Initiating STA (ISTA) and as a Responding STA (RSTA).

In some demonstrative embodiments, the ranging-to-self measurement sequence may be configured to reuse, e.g., even to completely reuse, the VHTz-SU sequence, for example, such that minimal or even no changes in fields of the frame formats of the VHTz-SU sequence may be required.

In some demonstrative embodiments, a duplication of a Null Data Packet (NDP) within a "Ranging-to-Self" sequence, e.g., as described below, may enable redundancy, may increase a probability of successful timing measurements, and/or may improve measurement accuracy, e.g., as described below.

In some demonstrative embodiments, device 140 may be configured to announce and/or broadcast a ranging-to-self sequence, and/or device 102 may be configured to receive and/or process the ranging-to-self sequence, e.g., as described below.

In some demonstrative embodiments, CToA component 157 may be configured to control, cause and/or trigger a bSTA implemented by device 140 to broadcast an announcement frame to announce a ranging-to-self sequence of a CToA measurement protocol, e.g., as described below.

In some demonstrative embodiments, CToA component 157 may be configured to control, cause and/or trigger the bSTA implemented by device 140 to broadcast a first ranging measurement frame of the ranging-to-self sequence, for example, subsequent to the announcement frame, e.g., as described below.

In some demonstrative embodiments, CToA component 157 may be configured to control, cause and/or trigger the bSTA implemented by device 140 to broadcast a second ranging measurement frame of the ranging-to-self sequence, for example, subsequent to the first ranging measurement frame, e.g., as described below.

In some demonstrative embodiments, CToA component 157 may be configured to control, cause and/or trigger the bSTA implemented by device 140 to broadcast a Location Measurement Report (LMR) frame of the ranging-to-self sequence, for example, subsequent to the second ranging measurement, e.g., as described below.

In some demonstrative embodiments, the LMR frame may include a Time of Departure (ToD) of the first ranging measurement frame, e.g., as described below.

In some demonstrative embodiments, the first ranging measurement frame may be a first Short Interframe Space (SIFS) after the announcement frame, the second ranging measurement frame may be a second SIFS after the first ranging measurement frame, and/or the LMR may be a third SIFS after the second ranging measurement frame, e.g., as described below.

In some demonstrative embodiments, CToA component 157 may be configured to control, cause and/or trigger the bSTA implemented by device 140 to transmit the first ranging measurement frame a SIFS after the announcement frame, to transmit the second ranging measurement frame a second SIFS after the first ranging measurement frame, and/or to transmit the LMR frame may be a third SIFS after the second ranging measurement frame, e.g., as described below.

In some demonstrative embodiments, the announcement frame may include an NDP Announcement (NDPA), the first ranging measurement frame may include a first NDP, and/or the second ranging measurement frame may include a second NDP, e.g., as described below.

In other embodiments, the announcement frame, the first ranging measurement frame, and/or the second ranging measurement frame may include any other type of frames.

In some demonstrative embodiments, the announcement frame may include a Receive Address (RA) field including an address of the bSTA, e.g., as described below.

In some demonstrative embodiments, the announcement frame may include the RA field including a same value as a Transmit Address (TA) field of the announcement frame, e.g., as described below.

In some demonstrative embodiments, the announcement frame may include the RA field including a broadcast address, e.g., as described below.

In some demonstrative embodiments, the announcement frame may include the RA field including a predefined value to indicate the ranging-to-self sequence, e.g., as described below.

In some demonstrative embodiments, the announcement frame may include a predefined field to indicate the ranging-to-self sequence, e.g., as described below.

In some demonstrative embodiments, the announcement frame may include a Frame-Control field to indicate the ranging-to-self sequence, e.g., as described below.

In some demonstrative embodiments, the announcement frame may include any other additional or alternative field or indication to indicate the ranging-to-self sequence.

In some demonstrative embodiments, the LMR frame may include measurement information including, for example, one of one or more ToD values and/or one or more Time of Arrival (ToA) values of previous measurements, for example, performed by device 140 and/or received from other devices, e.g., as described below.

In some demonstrative embodiments, the LMR frame may include scheduling information to schedule at least one subsequent ranging-to-self sequence, e.g., as described below.

In some demonstrative embodiments, the ranging-to-self sequence may be in compliance with a frame format of a VHT SU ranging measurement, e.g., as described below.

In some demonstrative embodiments, the announcement frame may be in compliance with a frame format of a VHTz announcement frame, and/or the first ranging measurement frame is in compliance with a frame format of a VHTz ranging measurement frame, e.g., as described below.

In some demonstrative embodiments, device 102 may receive and/or process the ranging-to-self sequence from device 140, e.g., as described below.

In some demonstrative embodiments, CToA component 117 may be configured to control, cause and/or trigger a CToA STA implemented by device 102 to process the announcement frame from device 140 to announce the ranging-to-self sequence from device 140, e.g., as described below.

In some demonstrative embodiments, CToA component 117 may be configured to control, cause and/or trigger the CToA STA implemented by device 102 to process the first ranging measurement frame of the ranging-to-self sequence from device 140, for example, subsequent to the announcement frame, e.g., as described below.

In some demonstrative embodiments, CToA component 117 may be configured to control, cause and/or trigger the CToA STA implemented by device 102 to process the second ranging measurement frame of the ranging-to-self sequence from device 140, for example, subsequent to the first ranging measurement frame from device 140, e.g., as described below.

In some demonstrative embodiments, CToA component 117 may be configured to control, cause and/or trigger the CToA STA implemented by device 102 to process the LMR frame of the ranging-to-self sequence, e.g., including the ToD of the first ranging measurement from device 140, for example, subsequent to the second ranging measurement, e.g., as described below.

In some demonstrative embodiments, CToA component 117 may be configured to control, cause and/or trigger the CToA STA implemented by device 102 to determine that the announcement frame is to announce the ranging-to-self sequence, for example, by identifying that the RA field of the announcement frame includes the address of the bSTA implemented by device 140, e.g., as described below.

In some demonstrative embodiments, CToA component 117 may be configured to control, cause and/or trigger the CToA STA implemented by device 102 to determine that the announcement frame is to announce the ranging-to-self sequence, for example, by identifying that the RA field of the announcement frame includes the same value as the TA field of the announcement frame, e.g., as described below.

In some demonstrative embodiments, CToA component 117 may be configured to control, cause and/or trigger the CToA STA implemented by device 102 to determine that the announcement frame is to announce the ranging-to-self sequence, for example, by identifying that the RA field of the announcement frame includes the broadcast address, e.g., as described below.

In some demonstrative embodiments, CToA component 117 may be configured to control, cause and/or trigger the CToA STA implemented by device 102 to determine that the announcement frame is to announce the ranging-to-self sequence, for example, by identifying that the RA field of the announcement frame includes a predefined value to indicate the ranging-to-self sequence, e.g., as described below.

In some demonstrative embodiments, CToA component 117 may be configured to control, cause and/or trigger the CToA STA implemented by device 102 to determine that the announcement frame is to announce the ranging-to-self sequence, for example, by identifying that the announcement frame includes a Frame-Control field to indicate the ranging-to-self sequence, e.g., as described below.

In some demonstrative embodiments, CToA component 117 may be configured to control, cause and/or trigger the CToA STA implemented by device 102 to determine a ToA of the first ranging measurement frame from device 140, e.g., as described below In some demonstrative embodiments, CToA component 117 may be configured to control, cause and/or trigger the CToA STA implemented by device 102 to determine a first ranging measurement, for example, based on the ToD of the first ranging measurement frame and the ToA of the first ranging measurement frame, e.g., as described below.

In one example, device 102 may determine a first ToF value of the first ranging measurement, for example, based on a time difference between the ToA and ToD of the first ranging measurement frame.

In some demonstrative embodiments, CToA component 117 may be configured to control, cause and/or trigger the CToA STA implemented by device 102 to determine a ToD of the second ranging measurement frame, for example, based on the ToD of the first ranging measurement frame and a SIFS, for example, by adding the SIFS to the ToD of the first ranging measurement frame, e.g., as described below.

In some demonstrative embodiments, CToA component 117 may be configured to control, cause and/or trigger the CToA STA implemented by device 102 to determine a ToA of the second ranging measurement frame, and to determine a second ranging measurement based on the ToD of the second ranging measurement frame and the ToA of the second ranging measurement frame, e.g., as described below.

In one example, device 102 may determine a second ToF value of the second ranging measurement, for example, based on a time difference between the ToA and ToD of the second ranging measurement frame.

In some demonstrative embodiments, CToA component 117 may be configured to control, cause and/or trigger the CToA STA implemented by device 102 to determine one or more ranging measurements, for example, based on the measurement information in the LMR frame, e.g., as described below.

In some demonstrative embodiments, CToA component 117 may be configured to control, cause and/or trigger the CToA STA implemented by device 102 to determine a schedule of at least one subsequent ranging-to-self sequence, for example, based on scheduling information in the LMR frame, e.g., as described below.

Figure 2:
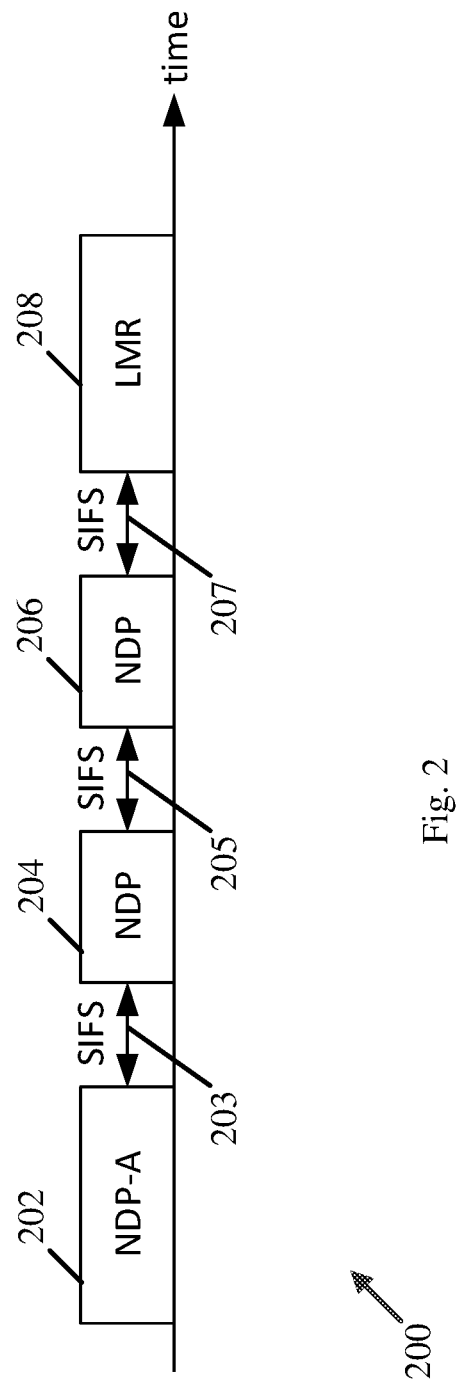
FIG. 2 is a schematic illustration of a ranging-to-self sequence, in accordance with some demonstrative embodiments.

Reference is made to FIG. 2, which schematically illustrates a ranging-to-self sequence 200, in accordance with some demonstrative embodiments.

In some demonstrative embodiments, a bSTA, e.g., device 140 (FIG. 1) may be configured to broadcast ranging-to-self sequence 200.

In some demonstrative embodiments, as shown in FIG. 2, ranging-to-self sequence 200 may include a transmission of an announcement frame 202, for example, an NDP announcement (NDP-A), e.g., to announce the ranging-to-self sequence 200.

In some demonstrative embodiments, as shown in FIG. 2, ranging-to-self sequence 200 may include a transmission of a first ranging measurement frame 202, for example, a first NDP, after the announcement frame 202, e.g., a first SIFS 203 after the announcement frame 202.

In some demonstrative embodiments, as shown in FIG. 2, ranging-to-self sequence 200 may include a transmission of a second ranging measurement frame 206, for example, a second NDP, after the first ranging measurement frame 202, e.g., a second SIFS 205 after the first ranging measurement frame 202.

In some demonstrative embodiments, as shown in FIG. 2, ranging-to-self sequence 200 may include a transmission of an LMR frame 208 after the second ranging measurement frame 206, e.g., a third SIFS 207 after the second ranging measurement frame 206.

In one example, a transmitter, for example, a bSTA, e.g., device 140 (FIG. 1), may transmit ranging-to-self sequence 200, for example, in a manner which may be analog to a Clear to Send (CTS) to Self (CTS to self) method, e.g., a method for medium reservation by transmission of a CTS frame, in which a Receiver Address (RA) is equal to a MAC address of a transmitter of the CTS frame, e.g., as described below.

In some demonstrative embodiments, a transmitter, for example, a bSTA, e.g., device 140 (FIG. 1), may perform a complete ranging sequence, e.g., a VHTz-SU sequence, with itself. For example, the transmitter may broadcast an NDPA, e.g., the NDP-A 202, followed by an NDP, e.g., NDP 204, and then the transmitter may "respond" to itself with another NDP, e.g., NDP 206, followed by an LMR, e.g., LMR 208.

In some demonstrative embodiments, LMR frame 208 may include a ToD of the first NDP frame 204, for example, optionally along with one or more past timing measurements collected by the bSTA, e.g., including ToA and/or ToD time-stamps, for example, of previous measurements.

In some demonstrative embodiments, LMR frame 208 may include scheduling information of a subsequent ranging-to-self measurement, for example, to enable one or more receivers to be available to receive the subsequent ranging-to-self measurement.

Figure 3:
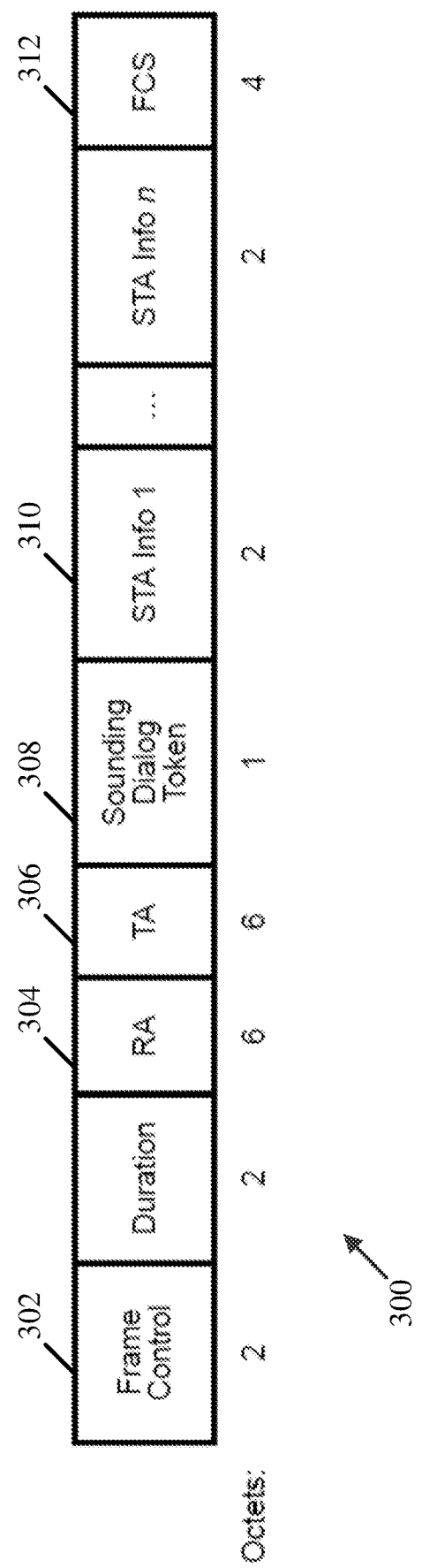
FIG. 3 is a schematic illustration of a format of an announcement frame, which may be implemented in accordance with some demonstrative embodiments.

Reference is made to FIG. 3, which schematically illustrates a format of an announcement frame 300, which may be implemented in accordance with some demonstrative embodiments.

In some demonstrative embodiments, the announcement frame 300 may include an NDPA, which may be in compliance with a frame format of a VHTz announcement frame.

In some demonstrative embodiments, a bSTA may be configured to broadcast announcement frame 300, for example, to announce a ranging-to-self sequence.

For example, a bSTA, e.g., device 140 (FIG. 1) may be configured to broadcast announcement frame 202 (FIG. 2) according to the format of broadcast announcement frame 300, for example, to announce ranging-to-self sequence 200 (FIG. 2).

In some demonstrative embodiments, as shown in FIG. 3, announcement frame 300 may include a frame control field 302, an RA field 304, a TA field 306 and one or more other fields including, for example, a sounding dialog token field 308, one or more STA information (Info) fields 310, and/or a Frame Check Sequence (FCS) field 312.

In some demonstrative embodiments, RA field 304 may be set to a same value of TA field 306, for example, to indicate the ranging-to-self sequence.

In some demonstrative embodiments, RA field 304 may be set to a broadcast MAC address, e.g., an address of "FF:FF:FF:FF:FF:FF", for example, to indicate the ranging-to-self sequence.

In some demonstrative embodiments, a receiver of announcement frame 300, e.g., device 102 (FIG. 1), may determine that announcement frame 300 is to indicate a ranging-to-self sequence, for example, based on the same value in TA field 306 and RA field 304, e.g., RA=TA, or based on the broadcast MAC address in RA field 304, e.g., RA=FF:FF:FF:FF:FF:FF.

In some demonstrative embodiments, announcement frame 300 may be configured to announce the ranging-to-self sequence, for example, based on bit-settings in the Frame-Control field 302 and/or any other field of announcement frame 300.

Referring back to FIG. 1, in some demonstrative embodiments, devices 102 and 140 may be configured to communicate NDP measurement frames, for example, even without performing a capabilities negotiation between devices 102 and 140, e.g., prior to the transmission of the NDP measurement frames.

In one example, in point to point (P2P) or point to multipoint (P2M) scenarios, a capabilities negotiation phase may be performed between a transmitter and a receiver, e.g., to negotiate one or more communication parameters for communication. The capabilities negotiation phase may enable the transmitter to match transmitted signal parameters to reception capacities of the receiver.

In some demonstrative embodiments, for example, NDP measurement frames may be used in scalable location for measurements of a time-delay or angular properties. One or more properties, which may be used for encoding the NDP measurement frames may vary, for example, according to the one or more communication parameters, e.g., a channel bandwidth supported by the receiver.

In some demonstrative embodiments, devices 102 and/or 140 may be configured to support a method, which may enable bSTAs to send the NDP measurement frames, while accommodating a wide variety of receivers, for example, even without a prior capabilities negotiation phase, e.g., as described below.

In some demonstrative embodiments, the method may support a low-end cSTA, e.g., a STA with limited Rx bandwidth and/or antenna capabilities, and/or high-end cSTAs, e.g., a STA with less limited capabilities, to measure a time of arrival (ToA) and/or an angle of departure (AoD) of NDP measurement frames, e.g., from a bSTA, for example, even without capabilities negotiation phase.

In some demonstrative embodiments, elimination of the capabilities negotiation phase may enable a wide range of devices, e.g., of different capabilities and/or of different vendors, to interoperate and/or estimate their location, while minimizing an air-interface occupancy.

In one example, bSTAs may be manufactured by different vendors and/or may have different capabilities, for example, in terms of RX bandwidth, number of receive antennas, and/or the like.

In some demonstrative embodiments, devices 102 and/or 140 may be configured to communicate Very High Throughput (VHT) Null Data Packets (NDPs), for example, in accordance with a Non-high-throughput (non-HT) duplicate transmission format.

In some demonstrative embodiments, the non-HT duplicate transmission format may define a transmission format ("a non-HT duplicate format") of a Physical Layer (PHY), which may duplicate a 20 Megahertz (MHz) non-HT transmission, for example, in two or more 20 MHz channels.

In some demonstrative embodiments, the non-HT duplicate format may allow a STA in a non-HT Basic Service Set (BSS) to receive the transmission on either channel of the two or more 20 MHz channels, e.g., as described below.

In some demonstrative embodiments, the non-HT duplicate format may be configured according to one or more transmission formats, e.g., as described below.

In some demonstrative embodiments, the non-HT duplicate format may include a 40 MHz non-HT duplicate format, which includes a transmission format of the PHY that duplicates a 20 MHz non-HT transmission, e.g., in two adjacent 20 MHz channels.

In some demonstrative embodiments, the non-HT duplicate format may include an 80 MHz non-HT duplicate format, which includes an transmission format of the PHY that duplicates a 20 MHz non-HT transmission, e.g., in four adjacent 20 MHz channels.

In some demonstrative embodiments, the non-HT duplicate format may include a 160 MHz non-HT duplicate format, which includes a transmission format of the PHY that duplicates a 20 MHz non-HT transmission, e.g., in eight adjacent 20 MHz channels.

In some demonstrative embodiments, the non-HT duplicate format may include an 80+80 MHz non-HT duplicate format, which includes a transmission format of the PHY that duplicates a 20 MHz non-HT transmission, for example, in first and second 80 MHZ non-adjacent frequency segments, e.g., each 80 MHZ segment including four adjacent 20 MHz channels.

In some demonstrative embodiments, it may be advantageous to utilize the non-HT duplicate format for VHT NDPs of a CToA timing measurement, e.g., in addition to or instead of a usage of the non-HT duplicate format for PHY protocol data units (PPDU), which may be in accordance with an IEEE 802.11ac Standard.

In some demonstrative embodiments, using the non-HT duplicate format with NDP VHT frames may enable receivers, e.g., bSTAs and/or cSTAs, with different capabilities, e.g., in terms of an RX bandwidth, number of RX antennas and the like, to receive, e.g., from a transmitter, VHT NDPs with signal bandwidths that exceed their capabilities, and/or even without any prior capabilities negotiation between the transmitter and the receivers In some demonstrative embodiments, device 140 may be configured to broadcast a VHT NDP for a ranging measurement, which may enable bSTAs and/or cSTAs, e.g., including device 102, to receive and process the VHT NDP, e.g., even without performing a capability negotiation with device 140, e.g., as described below.

In some demonstrative embodiments, CToA component 157 may be configured to control, cause and/or trigger the bSTA implemented by device 140 to broadcast a VHT NDP Announcement (NDPA) to announce a transmission of a VHT NDP over a channel bandwidth including a plurality of channels, e.g., as described below.

In some demonstrative embodiments, the VHT NDP may be configured for a ranging measurement, e.g., as described below.

In some demonstrative embodiments, the ranging measurement may include a Time of Arrival (ToA) measurement and/or an angle of Departure (AoD) measurement, e.g., as described below.

In some demonstrative embodiments, the ranging measurement may include any other additional or alternative ranging and/or positioning measurement.

In some demonstrative embodiments, CToA component 157 may be configured to control, cause and/or trigger the bSTA implemented by device 140 to broadcast the transmission of the VHT NDP over the channel bandwidth announced by the VHT NDPA, for example, by duplicating a plurality of NDP fields of the VHT NDP over the plurality of channels in the channel bandwidth, e.g., as described below.

In some demonstrative embodiments, the plurality of NDP fields may include a first plurality of Non-High-Throughput (non-HT) fields and a second plurality of VHT fields configured for the ranging measurement, e.g., as described below.

In some demonstrative embodiments, the first plurality of non-HT fields may include a non-HT Short Training Field (STF) (L-STF), a non-HT Long Training Field (LTF) (L-LTF), and/or a non-HT Signal (L-SIG) field, e.g., as described below.

In other embodiments, the first plurality of non-HT fields may include any other additional and/or alternative fields.

In some demonstrative embodiments, the second plurality of VHT fields may include a VHT Signal A field (VHT-SIG-A), a VHT Short Training Field (STF) (VHT-STF), a VHT Long Training Field (LTF) (VHT-LTF), and/or a VHT Signal B Field (VHT-SIG-B), e.g., as described below.

In other embodiments, the second plurality of non-HT fields may include any other additional and/or alternative fields.

In some demonstrative embodiments, CToA component 157 may be configured to control, cause and/or trigger the bSTA implemented by device 140 to broadcast the transmission of the VHT NDP over a 40 MHz channel bandwidth including two adjacent 20 MHZ channels, for example, by duplicating the plurality of NDP fields over the two adjacent 20 MHZ channels, e.g., as described below.

In some demonstrative embodiments, CToA component 157 may be configured to control, cause and/or trigger the bSTA implemented by device 140 to broadcast the transmission of the VHT NDP over an 80 MHz channel bandwidth including four adjacent 20 MHZ channels, for example, by duplicating the plurality of NDP fields over the four adjacent 20 MHZ channels, e.g., as described below.

In some demonstrative embodiments, CToA component 157 may be configured to control, cause and/or trigger the bSTA implemented by device 140 to broadcast the transmission of the VHT NDP over a 160 MHz channel bandwidth including eight adjacent 20 MHZ channels, for example, by duplicating the plurality of NDP fields over the eight adjacent 20 MHZ channels, e.g., as described below.

In some demonstrative embodiments, CToA component 157 may be configured to control, cause and/or trigger the bSTA implemented by device 140 to broadcast the transmission of the VHT NDP over a 80+80 MHz channel bandwidth including first and second non-adjacent 80 MHZ channels, for example, by duplicating the plurality of NDP fields over first four adjacent 20 MHZ channels in the first 80 MHz channel and over second four adjacent 20 MHZ channels in the second 80 MHz channel, e.g., as described below.

In some demonstrative embodiments, CToA component 157 may be configured to control, cause and/or trigger the bSTA implemented by device 140 to broadcast a VHT Long Training Field (LTF) of the second plurality of VHT fields over the plurality of channels by broadcasting a sequence of a plurality of duplicates of the VHT LTF over the plurality of channels, respectively, e.g., as described below.

In some demonstrative embodiments, the VHT-LTF field may be configured to enable a receiver of the VHT NDP, e.g., device 102, to estimate a MIMO channel between receive chains of the receiver and a set of constellation mapper outputs or Space-Time Block Coding (STBC) encoder outputs, e.g., if STBC is applied.

For example, when a number, denoted Nix, of antennas of a transmitter of the VHT NDP is greater than one, e.g., Ntx>1, VHT-LTF symbols may be transmitted staggered in time, for example, to enable a receiver with a low number of antennas to receive the VHT-LTF symbols correctly, for example, instead of multiplexing, e.g., jointly, the VHT-LTF symbols from the Nix antennas of the transmitter, e.g., using a Hadamard code.

In one example, the transmission of the VHT-LTF symbols may enable receivers having a single antenna and/or a low-memory footprint to estimate the MIMO channel, for example, even if using a single symbol, for example, instead of receiving Nix symbols, and buffering and decoding the Nix symbols. However, in some cases this may result with a Signal To Noise Ratio (SNR) loss at the receiver.

Figure 4:
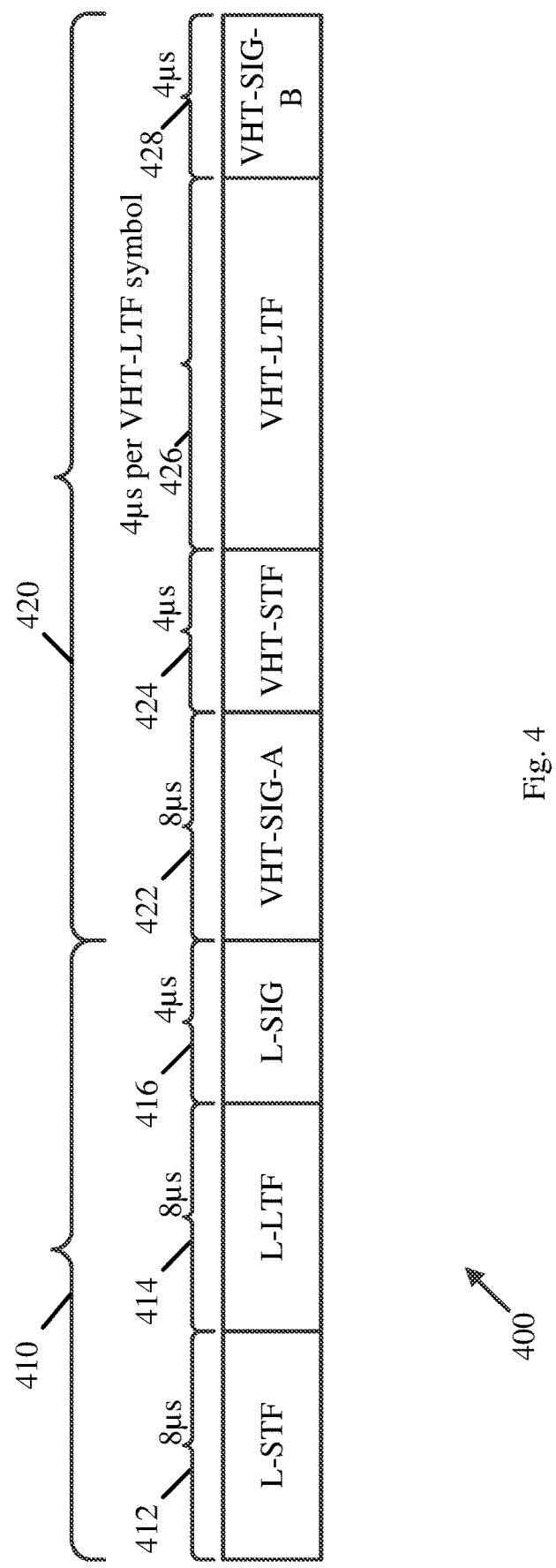
FIG. 4 is a schematic illustration of a format of a Very High Throughput (VHT) Null Data Packet (NDP), which may be implemented in accordance with some demonstrative embodiments.

Reference is made to FIG. 4, which schematically illustrates a format of a VHT NDP 400, which may be implemented in accordance with some demonstrative embodiments.

In one example, a bSTA, e.g., device 140 (FIG. 1) may be configured to broadcast VHT NDP 400, e.g., for a ranging measurement.

In one example, as shown in FIG. 4, VHT NDP 400 may include a plurality of fields, e.g., in a time-domain field structure.

In some demonstrative embodiments, as shown in FIG. 4, VHT NDP 400 may include a plurality of NDP fields including a first plurality of non-HT fields 410 and a second plurality of VHT fields 420, which may be configured for the ranging measurement, In some demonstrative embodiments, as shown in FIG. 4, the first plurality of non-HT fields 410 may include a non-HT STF field 412 (L-STF), a non-HT LTF field 414 (L-LTF), and a non-HT Signal (L-SIG) field 416.

In other embodiments, the first plurality of non-HT fields 410 may include any other additional and/or alternative fields.

In some demonstrative embodiments, as shown in FIG. 4, the second plurality of VHT fields 420 may a VHT-SIG-A field 422, a VHT STF field 424, a VHT LTF field 426, and a VHT Signal B Field 428 (VHT-SIG-B).

In other embodiments, the second plurality of non-HT fields 420 may include any other additional and/or alternative fields.

In some demonstrative embodiments, one or more of the plurality of NDP fields 410 and/or 420 may be defined, e.g., as follows:

TABLE 1

| Description | Description |
|---|---|
| L-STF | Non-HT Short Training field |
| L-LTF | Non-HT Long Training field |

TABLE 1-continued

| Description | Description |
|---|---|
| L-SIG | Non-HT SIGNAL field |
| VHT-SIG-A | VHT Signal A field |
| VHT-STF | VHT Short Training field |
| VHT-LTF | VHT Long Training field |
| VHT-SIG-B | VHT Signal B field |

In some demonstrative embodiments, broadcast of NDPs as measurement frames, e.g., in the format of VHT NDP 400, may be used for one or more different types of measurements, e.g., including fine-time measurement (FTM), and/or an angular measurement, e.g., an Angle of Departure (AoD) measurement of a bSTA/AP with respect to a measuring client STA, and the like.

Figure 5:
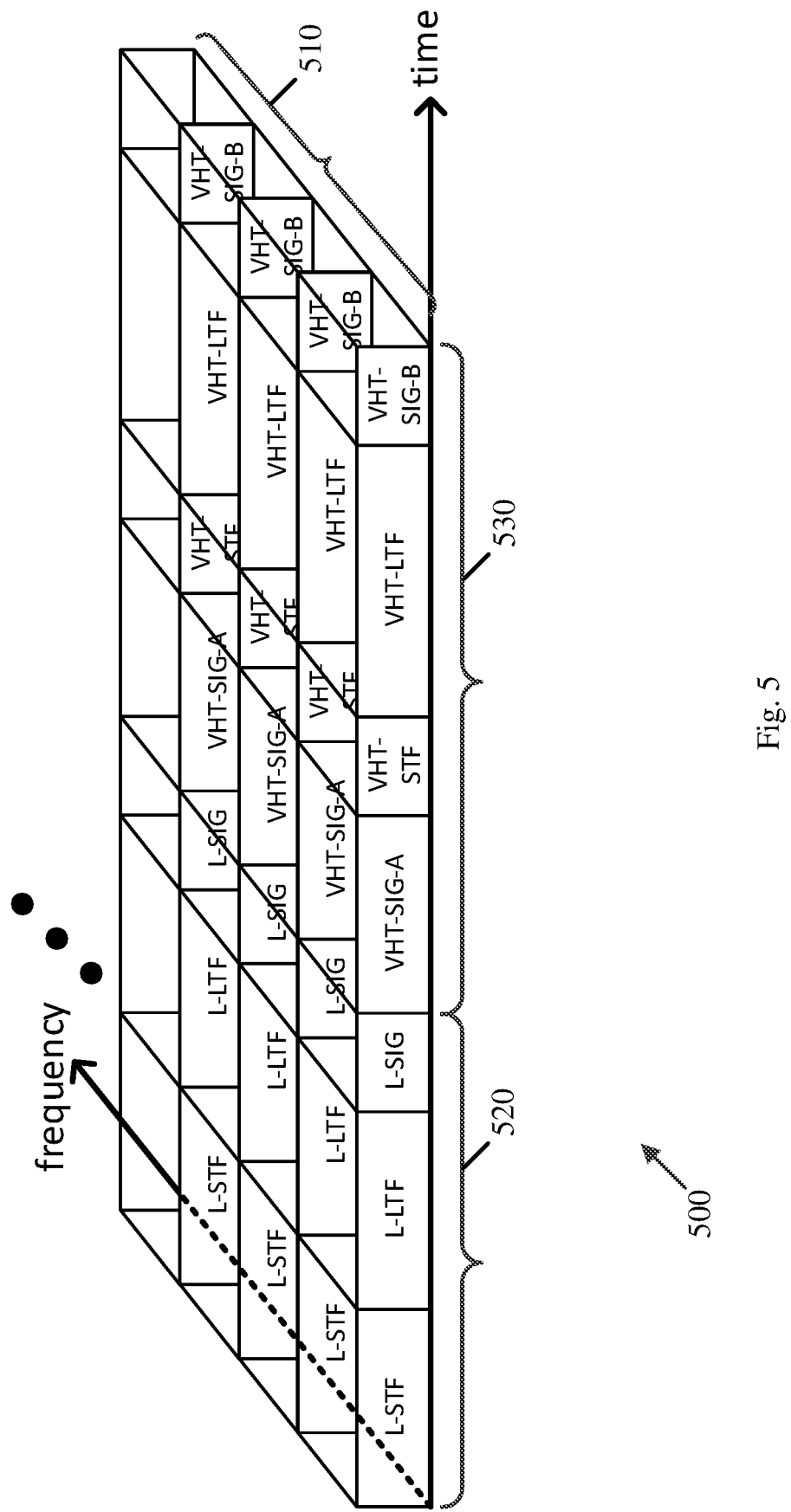
FIG. 5 is a schematic illustration of a VHT NDP transmission, in accordance with some demonstrative embodiments.

Reference is made to FIG. 5, which schematically illustrates a VHT NDP transmission 500, in accordance with some demonstrative embodiments.

In some demonstrative embodiments, device 140 (FIG. 1) may broadcast a VHT NDP, e.g., VHT NDP 400 (FIG. 4), in the form of VHT NDP transmission 500.

In some demonstrative embodiments, as shown in FIG. 5, VHT NDP transmission 500 may be over a channel bandwidth including a plurality of channels 510.

In some demonstrative embodiments, as shown in FIG. 5, VHT NDP transmission 500 may be broadcasted, for example, by duplicating a plurality of NDP fields of the VHT NDP transmission 500 over the plurality of channels 510.

In some demonstrative embodiments, as shown in FIG. 5, the plurality of NDP fields of the VHT NDP transmission 500 may include a first plurality of non-HT fields 520, e.g., including one or more fields of the first plurality of non-HT fields 410 (FIG. 4), and a second plurality of VHT fields 530, e.g., including one or more of the second plurality of VHT fields 420 (FIG. 4).

Referring back to FIG. 1, in some demonstrative embodiments, device 102 may be configured to broadcast the transmission of the VHT NDP over the channel bandwidth, for example, by duplicating the second plurality of VHT fields, e.g., the second plurality of VHT fields 420 (FIG. 4), e.g., as described above.

In some demonstrative embodiments, the second plurality of VHT fields, e.g., the second plurality of VHT fields 420 (FIG. 4), may include at least one angular measurement field configured for an angular measurement, e.g., as described below.

In some demonstrative embodiments, CToA component 157 may be configured to control, cause and/or trigger the bSTA implemented by device 140 to broadcast over each channel of the plurality of channels a plurality of duplicates of the angular measurement field, e.g., as described below.

In some demonstrative embodiments, OFDM symbol tones may be beamformed towards different directions, e.g., during angular/AoD measurements. For example, each OFDM symbol tone may be beamformed towards a different direction.

For example, a direction to tone mapping may be repeated within symbol tones for frequency-diversity. For example, this repetition may be duplicated over the plurality of channels.

Figure 6:
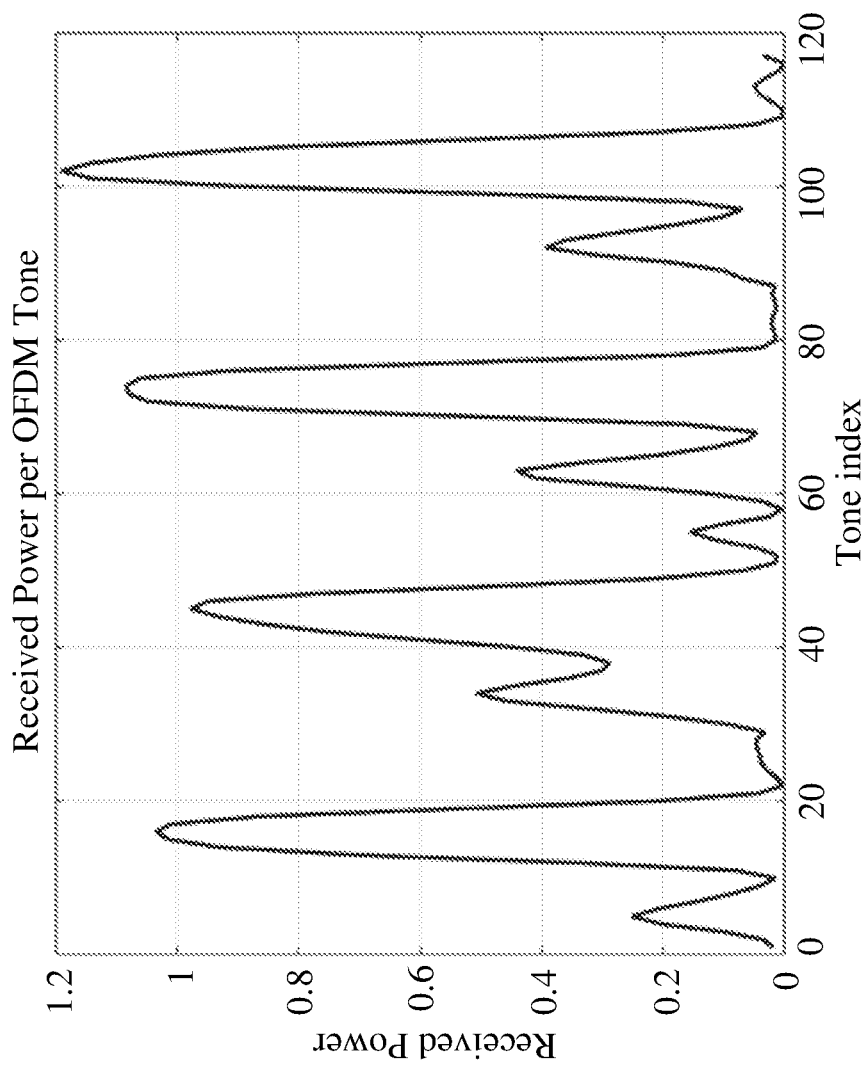
FIG. 6 is a schematic illustration of a graph depicting a channel response of a channel bandwidth, in accordance with some demonstrative embodiments.

Reference is made to FIG. 6, which schematically illustrates a graph 600 depicting a channel response of a channel bandwidth, in accordance with some demonstrative embodiments.

In some demonstrative embodiments, the channel response depicted by graph 600 may correspond to a 40 MHz channel, in which each beamformed direction is repeated 4 times.

In some demonstrative embodiments, a similar repetition, e.g., having a reduced angular resolution, may be applied, for example, to a 20 MHz channel, and may be duplicated, for example, over 2-8 additional channels of 20 MHz.

Figure 7:
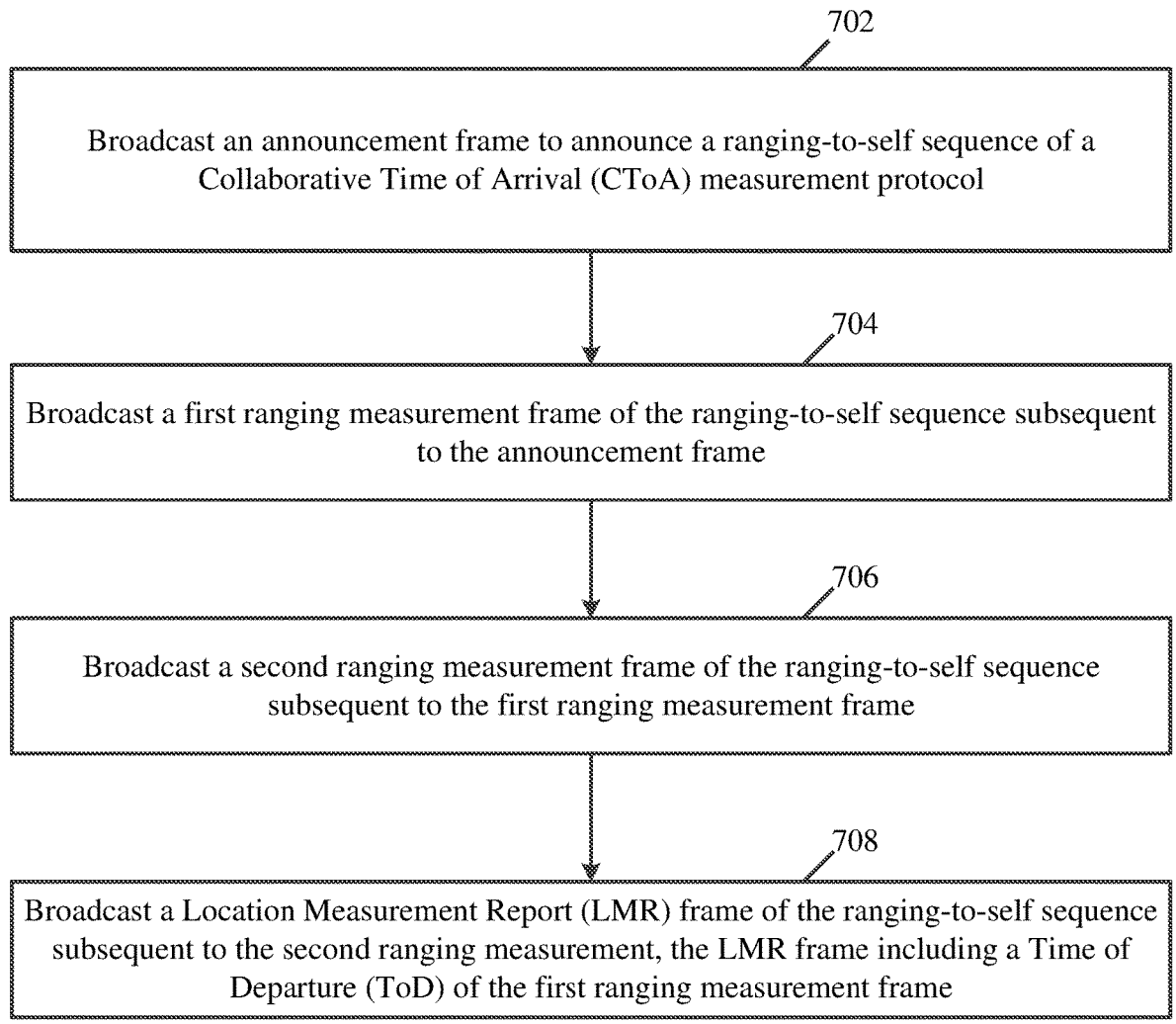
FIG. 7 is a schematic flow-chart illustration of a method of CToA measurement, in accordance with some demonstrative embodiments.

Reference is made to FIG. 7, which schematically illustrates a method of CToA, in accordance with some demonstrative embodiments. For example, one or more of the operations of the method of FIG. 7 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an application, e.g., application 125 (FIG. 1); a CToA component, e.g., CToA components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 702, the method may include broadcasting from a bSTA an announcement frame to announce a ranging-to-self sequence of a CToA measurement protocol. For example, CToA component 157 (FIG. 1) may control, cause and/or trigger the bSTA implemented by device 140 (FIG. 1) to broadcast the announcement frame to announce the ranging-to-self sequence of the CToA measurement protocol, e.g., as described above.

As indicated at block 704, the method may include broadcasting a first ranging measurement frame of the ranging-to-self sequence subsequent to the announcement frame. For example, CToA component 157 (FIG. 1) may control, cause and/or trigger the bSTA implemented by device 140 (FIG. 1) to broadcast the first ranging measurement frame of the ranging-to-self sequence subsequent to the announcement frame, e.g., as described above.

As indicated at block 706, the method may include broadcasting a second ranging measurement frame of the ranging-to-self sequence subsequent to the first ranging measurement frame. For example, CToA component 157 (FIG. 1) may control, cause and/or trigger the bSTA implemented by device 140 (FIG. 1) to broadcast the second ranging measurement frame of the ranging-to-self sequence subsequent to the first ranging measurement frame, e.g., as described above.

As indicated at block 708, the method may include broadcasting an LMR frame of the ranging-to-self sequence subsequent to the second ranging measurement. For example, the LMR frame may include a ToD of the first ranging measurement frame. For example, CToA component 157 (FIG. 1) may control, cause and/or trigger the bSTA implemented by device 140 (FIG. 1) to broadcast the LMR frame of the ranging-to-self sequence subsequent to the second ranging measurement, e.g., as described above.

Figure 8:
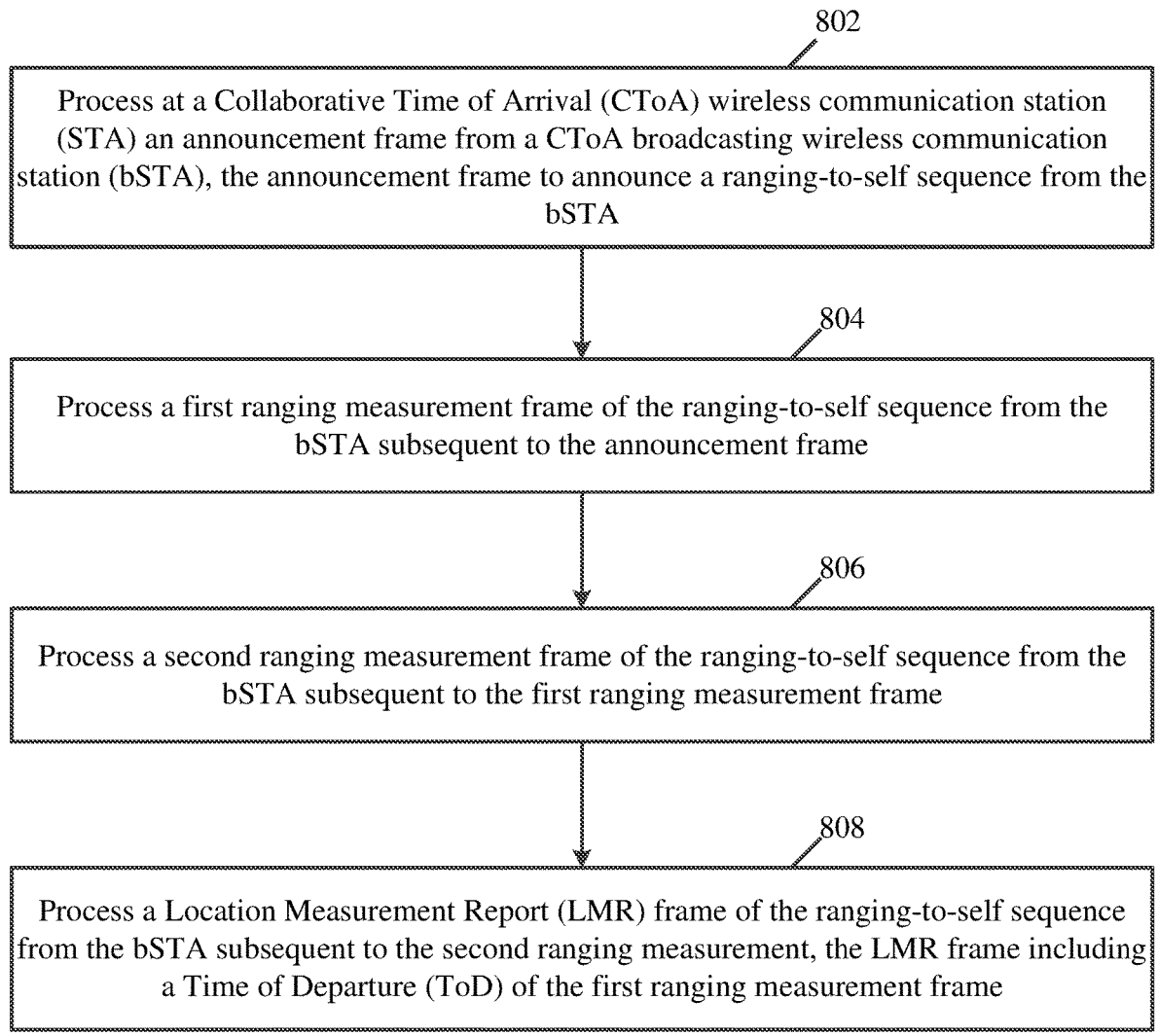
FIG. 8 is a schematic flow-chart illustration of a method of CToA measurement, in accordance with some demonstrative embodiments.

Reference is made to FIG. 8, which schematically illustrates a method of CToA, in accordance with some demonstrative embodiments. For example, one or more of the operations of the method of FIG. 8 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an application, e.g., application 125 (FIG. 1); a CToA component, e.g., CToA components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 802, the method may include processing at a CToA STA an announcement frame from a bSTA, the announcement frame to announce a ranging-to-self sequence from the bSTA. For example, CToA component 117 (FIG. 1) may control, cause and/or trigger the CToA STA implemented by device 102 (FIG. 1) to process the announcement frame from device 140 (FIG. 1) to announce the ranging-to-self sequence from device 140 (FIG. 1), e.g., as described above.

As indicated at block 804, the method may include processing a first ranging measurement frame of the ranging-to-self sequence from the bSTA subsequent to the announcement frame. For example, CToA component 117 (FIG. 1) may control, cause and/or trigger the CToA STA implemented by device 102 (FIG. 1) to process the first ranging measurement frame of the ranging-to-self sequence from device 140 (FIG. 1) subsequent to the announcement frame, e.g., as described above.

As indicated at block 806, the method may include processing a second ranging measurement frame of the ranging-to-self sequence from the bSTA subsequent to the first ranging measurement frame. For example, CToA component 117 (FIG. 1) may control, cause and/or trigger the CToA STA implemented by device 102 (FIG. 1) to process the second ranging measurement frame of the ranging-to-self sequence from device 140 (FIG. 1) subsequent to the first ranging measurement frame, e.g., as described above.

Figure 9:
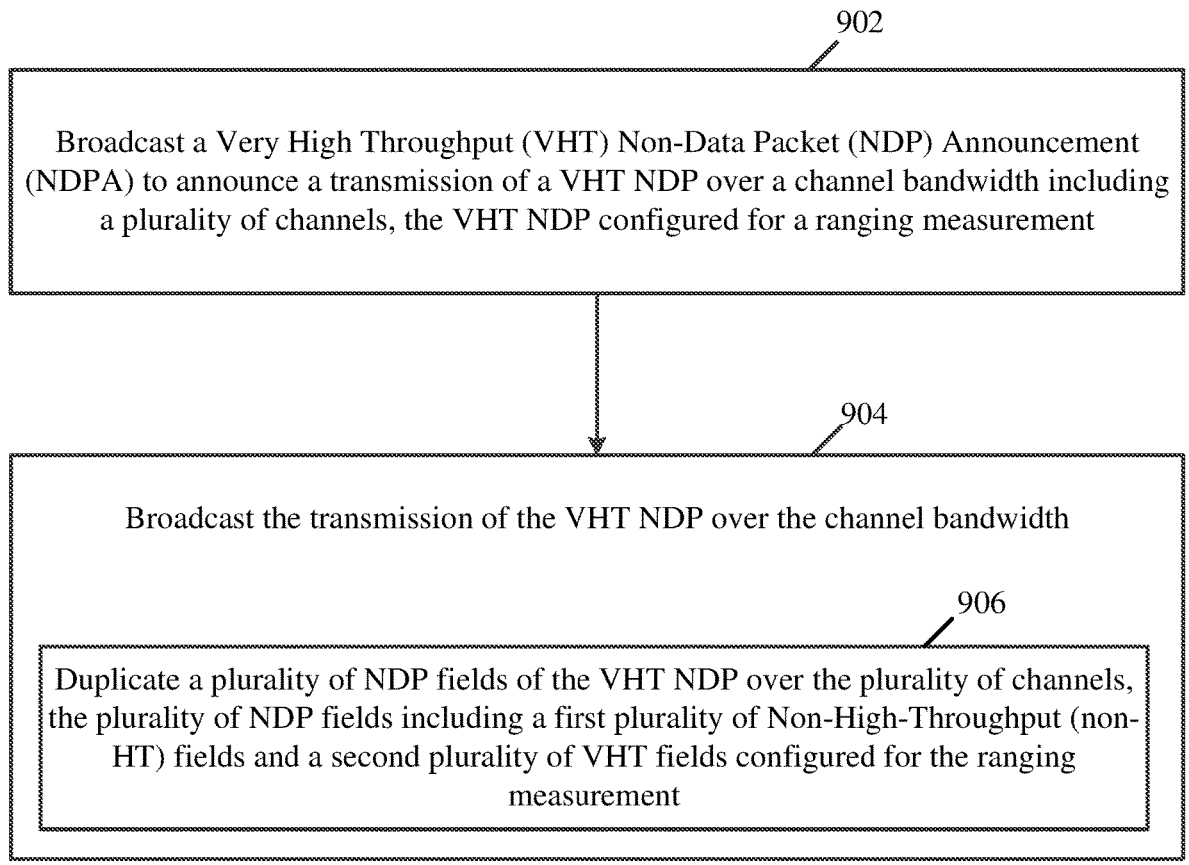
FIG. 9 is a schematic flow-chart illustration of a method of CToA measurement, in accordance with some demonstrative embodiments.

As indicated at block 808, the method may include processing an LMR frame of the ranging-to-self sequence from the bSTA subsequent to the second ranging measurement. For example, the LMR frame may include a ToD of the first ranging measurement frame. For example, CToA component 117 (FIG. 1) may control, cause and/or trigger the CToA STA implemented by device 102 (FIG. 1) to process the LMR frame of the ranging-to-self sequence from device 140 (FIG. 1) subsequent to the second ranging measurement, for example, by processing the ToD of the first ranging measurement frame, e.g., as described above Reference is made to FIG. 9, which schematically illustrates a method of CToA, in accordance with some demonstrative embodiments. For example, one or more of the operations of the method of FIG. 9 may be performed by a wireless communication system, e.g., system 100 (FIG. 1); a wireless communication device, e.g., devices 102 and/or 140 (FIG. 1); a controller, e.g., controllers 124 and/or 154 (FIG. 1); an application, e.g., application 125 (FIG. 1); a CToA component, e.g., CToA components 117 and/or 157 (FIG. 1); a location estimator, e.g., location estimator 115 (FIG. 1); a radio, e.g., radios 114 and/or 144 (FIG. 1); a message processor, e.g., message processor 128 (FIG. 1) and/or message processor 158 (FIG. 1); a transmitter, e.g., transmitters 118 and/or 148 (FIG. 1); and/or a receiver, e.g., receivers 116 and/or 146 (FIG. 1).

As indicated at block 902, the method may include broadcasting from a bSTA a VHT NDPA to announce a transmission of a VHT NDP over a channel bandwidth including a plurality of channels, the VHT NDP configured for a ranging measurement. For example, CToA component 157 (FIG. 1) may control, cause and/or trigger the bSTA implemented by device 140 (FIG. 1) to broadcast the VHT NDPA to announce the transmission of the VHT NDP over the channel bandwidth including the plurality of channels, the VHT NDP configured for the ranging measurement, e.g., as described above.

As indicated at block 904, the method may include broadcasting the transmission of the VHT NDP over the channel bandwidth. For example, CToA component 157 (FIG. 1) may control, cause and/or trigger the bSTA implemented by device 140 (FIG. 1) to broadcast the VHT NDPA over the channel bandwidth, e.g., as described above.

As indicated at block 906, broadcasting the transmission of the VHT NDP may include duplicating a plurality of NDP fields of the VHT NDP over the plurality of channels, the plurality of NDP fields including a first plurality of non-HT fields and a second plurality of VHT fields configured for the ranging measurement. For example, CToA component 157 (FIG. 1) may control, cause and/or trigger the bSTA implemented by device 140 (FIG. 1) to duplicate the plurality of NDP fields of the VHT NDP over the plurality of channels, e.g., as described above.

Figure 10:
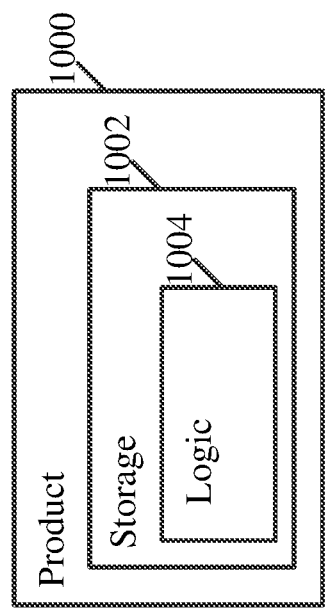
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include one or more tangible computer-readable ("machine readable") non-transitory storage media 1002, which may include computer-executable instructions, e.g., implemented by logic 1004, operable to, when executed by at least one processor, e.g., computer processor, enable the at least one processor to implement one or more operations at devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), CToA components 117 and/or 157 (FIG. 1), and/or location estimator 115 (FIG. 1), to cause devices 102 and/or 140 (FIG. 1), radios 114 and/or 144 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), CToA components 117 and/or 157 (FIG. 1), and/or location estimator 115 (FIG. 1) to perform one or more operations, and/or to perform, trigger and/or implement one or more operations, communications and/or functionalities described above with reference to FIGS. 1, 2, 3, 4, 5, 6, 7, 8 and/or 9, and/or one or more operations described herein. The phrases "non-transitory machine-readable media (medium)" and "computer-readable non-transitory storage media (medium)" are directed to include all computer-readable media, with the sole exception being a transitory propagating signal.

In some demonstrative embodiments, product 1000 and/or storage media 1002 may include one or more types of computer-readable storage media capable of storing data, including volatile memory, non-volatile memory, removable or non-removable memory, erasable or non-erasable memory, writeable or re-writeable memory, and the like. For example, storage media 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a Collaborative Time of Arrival (CToA) broadcasting wireless communication station (STA) (bSTA) to broadcast an announcement frame to announce a ranging-to-self sequence of a CToA measurement protocol; broadcast a first ranging measurement frame of the ranging-to-self sequence subsequent to the announcement frame; broadcast a second ranging measurement frame of the ranging-to-self sequence subsequent to the first ranging measurement frame; and broadcast a Location Measurement Report (LMR) frame of the ranging-to-self sequence subsequent to the second ranging measurement frame, the LMR frame comprising a Time of Departure (ToD) of the first ranging measurement frame.

Example 2 includes the subject matter of Example 1, and optionally, wherein the announcement frame comprises a Receive Address (RA) field comprising an address of the bSTA.

Example 3 includes the subject matter of Example 1, and optionally, wherein the announcement frame comprises a Receive Address (RA) field comprising a same value as a Transmit Address (TA) field of the announcement frame.

Example 4 includes the subject matter of Example 1, and optionally, wherein the announcement frame comprises a Receive Address (RA) field comprising a broadcast address.

Example 5 includes the subject matter of Example 1, and optionally, wherein the announcement frame comprises a Receive Address (RA) field comprising a predefined value to indicate the ranging-to-self sequence.

Example 6 includes the subject matter of any one of Examples 1-5, and optionally, wherein the announcement frame comprises a predefined field to indicate the ranging-to-self sequence.

Example 7 includes the subject matter of any one of Examples 1-6, and optionally, wherein the announcement frame comprises a Frame-Control field to indicate the ranging-to-self sequence.

Example 8 includes the subject matter of any one of Examples 1-7, and optionally, wherein the LMR frame comprises measurement information comprising at least one of one or more ToD values or one or more Time of Arrival (ToA) values of previous measurements.

Example 9 includes the subject matter of any one of Examples 1-8, and optionally, wherein the LMR frame comprises scheduling information to schedule at least one subsequent ranging-to-self sequence.

Example 10 includes the subject matter of any one of Examples 1-9, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 11 includes the subject matter of any one of Examples 1-10, and optionally, wherein the apparatus is configured to cause the bSTA to transmit the first ranging measurement frame a first Short Interframe Space (SIFS) after the announcement frame, to transmit the second ranging measurement frame a second SIFS after the first ranging measurement frame, and to transmit the location measurement report a third SIFS after the second ranging measurement frame.

Example 12 includes the subject matter of any one of Examples 1-11, and optionally, wherein the announcement frame comprises a Null Data Packet (NDP) Announcement (NDPA), the first ranging measurement frame comprises a first NDP, and the second ranging measurement frame comprises a second NDP.

Example 13 includes the subject matter of any one of Examples 1-12, and optionally, comprising a memory, a processor, a radio, and one or more antennas.

Example 14 includes a system of wireless communication comprising a Collaborative Time of Arrival (CToA) broadcasting wireless communication station (STA) (bSTA), the bSTA comprising a radio; a memory; a processor; one or more antennas; and a controller configured to cause the bSTA to broadcast an announcement frame to announce a ranging-to-self sequence of a CToA measurement protocol; broadcast a first ranging measurement frame of the ranging-to-self sequence subsequent to the announcement frame; broadcast a second ranging measurement frame of the ranging-to-self sequence subsequent to the first ranging measurement frame; and broadcast a Location Measurement Report (LMR) frame of the ranging-to-self sequence subsequent to the second ranging measurement frame, the LMR frame comprising a Time of Departure (ToD) of the first ranging measurement frame.

Example 15 includes the subject matter of Example 14, and optionally, wherein the announcement frame comprises a Receive Address (RA) field comprising an address of the bSTA.

Example 16 includes the subject matter of Example 14, and optionally, wherein the announcement frame comprises a Receive Address (RA) field comprising a same value as a Transmit Address (TA) field of the announcement frame.

Example 17 includes the subject matter of Example 14, and optionally, wherein the announcement frame comprises a Receive Address (RA) field comprising a broadcast address.

Example 18 includes the subject matter of Example 14, and optionally, wherein the announcement frame comprises a Receive Address (RA) field comprising a predefined value to indicate the ranging-to-self sequence.

Example 19 includes the subject matter of any one of Examples 14-18, and optionally, wherein the announcement frame comprises a predefined field to indicate the ranging-to-self sequence.

Example 20 includes the subject matter of any one of Examples 14-19, and optionally, wherein the announcement frame comprises a Frame-Control field to indicate the ranging-to-self sequence.

Example 21 includes the subject matter of any one of Examples 14-20, and optionally, wherein the LMR frame comprises measurement information comprising at least one of one or more ToD values or one or more Time of Arrival (ToA) values of previous measurements.

Example 22 includes the subject matter of any one of Examples 14-21, and optionally, wherein the LMR frame comprises scheduling information to schedule at least one subsequent ranging-to-self sequence.

Example 23 includes the subject matter of any one of Examples 14-22, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 24 includes the subject matter of any one of Examples 14-23, and optionally, wherein the controller is configured to cause the bSTA to transmit the first ranging measurement frame a first Short Interframe Space (SIFS) after the announcement frame, to transmit the second ranging measurement frame a second SIFS after the first ranging measurement frame, and to transmit the location measurement report a third SIFS after the second ranging measurement frame.

Example 25 includes the subject matter of any one of Examples 14-24, and optionally, wherein the announcement frame comprises a Null Data Packet (NDP) Announcement (NDPA), the first ranging measurement frame comprises a first NDP, and the second ranging measurement frame comprises a second NDP.

Example 26 includes a method to be performed at a Collaborative Time of Arrival (CToA) broadcasting wireless communication station (STA) (bSTA), the method comprising broadcasting an announcement frame to announce a ranging-to-self sequence of a CToA measurement protocol; broadcasting a first ranging measurement frame of the ranging-to-self sequence subsequent to the announcement frame; broadcasting a second ranging measurement frame of the ranging-to-self sequence subsequent to the first ranging measurement frame; and broadcasting a Location Measurement Report (LMR) frame of the ranging-to-self sequence subsequent to the second ranging measurement frame, the LMR frame comprising a Time of Departure (ToD) of the first ranging measurement frame.

Example 27 includes the subject matter of Example 26, and optionally, wherein the announcement frame comprises a Receive Address (RA) field comprising an address of the bSTA.

Example 28 includes the subject matter of Example 26, and optionally, wherein the announcement frame comprises a Receive Address (RA) field comprising a same value as a Transmit Address (TA) field of the announcement frame.

Example 29 includes the subject matter of Example 26, and optionally, wherein the announcement frame comprises a Receive Address (RA) field comprising a broadcast address.

Example 30 includes the subject matter of Example 26, and optionally, wherein the announcement frame comprises a Receive Address (RA) field comprising a predefined value to indicate the ranging-to-self sequence.

Example 31 includes the subject matter of any one of Examples 26-30, and optionally, wherein the announcement frame comprises a predefined field to indicate the ranging-to-self sequence.

Example 32 includes the subject matter of any one of Examples 26-31, and optionally, wherein the announcement frame comprises a Frame-Control field to indicate the ranging-to-self sequence.

Example 33 includes the subject matter of any one of Examples 26-32, and optionally, wherein the LMR frame comprises measurement information comprising at least one of one or more ToD values or one or more Time of Arrival (ToA) values of previous measurements.

Example 34 includes the subject matter of any one of Examples 26-33, and optionally, wherein the LMR frame comprises scheduling information to schedule at least one subsequent ranging-to-self sequence.

Example 35 includes the subject matter of any one of Examples 26-34, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 36 includes the subject matter of any one of Examples 26-35, and optionally, comprising transmitting the first ranging measurement frame a first Short Interframe Space (SIFS) after the announcement frame, transmitting the second ranging measurement frame a second SIFS after the first ranging measurement frame, and transmitting the location measurement report a third SIFS after the second ranging measurement frame.

Example 37 includes the subject matter of any one of Examples 26-36, and optionally, wherein the announcement frame comprises a Null Data Packet (NDP) Announcement (NDPA), the first ranging measurement frame comprises a first NDP, and the second ranging measurement frame comprises a second NDP.

Example 38 includes a product comprising one or more tangible computer-readable non-transitory storage media comprising computer-executable instructions operable to, when executed by at least one processor, enable the at least one processor to cause a Collaborative Time of Arrival (CToA) broadcasting wireless communication station (STA) (bSTA) to broadcast an announcement frame to announce a ranging-to-self sequence of a CToA measurement protocol; broadcast a first ranging measurement frame of the ranging-to-self sequence subsequent to the announcement frame; broadcast a second ranging measurement frame of the ranging-to-self sequence subsequent to the first ranging measurement frame; and broadcast a Location Measurement Report (LMR) frame of the ranging-to-self sequence subsequent to the second ranging measurement frame, the LMR frame comprising a Time of Departure (ToD) of the first ranging measurement frame.

Example 39 includes the subject matter of Example 38, and optionally, wherein the announcement frame comprises a Receive Address (RA) field comprising an address of the bSTA.

Example 40 includes the subject matter of Example 38, and optionally, wherein the announcement frame comprises a Receive Address (RA) field comprising a same value as a Transmit Address (TA) field of the announcement frame.

Example 41 includes the subject matter of Example 38, and optionally, wherein the announcement frame comprises a Receive Address (RA) field comprising a broadcast address.

Example 42 includes the subject matter of Example 38, and optionally, wherein the announcement frame comprises a Receive Address (RA) field comprising a predefined value to indicate the ranging-to-self sequence.

Example 43 includes the subject matter of any one of Examples 38-42, and optionally, wherein the announcement frame comprises a predefined field to indicate the ranging-to-self sequence.

Example 44 includes the subject matter of any one of Examples 38-43, and optionally, wherein the announcement frame comprises a Frame-Control field to indicate the ranging-to-self sequence.

Example 45 includes the subject matter of any one of Examples 38-44, and optionally, wherein the LMR frame comprises measurement information comprising at least one of one or more ToD values or one or more Time of Arrival (ToA) values of previous measurements.

Example 46 includes the subject matter of any one of Examples 38-45, and optionally, wherein the LMR frame comprises scheduling information to schedule at least one subsequent ranging-to-self sequence.

Example 47 includes the subject matter of any one of Examples 38-46, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 48 includes the subject matter of any one of Examples 38-47, and optionally, wherein the instructions, when executed, cause the bSTA to transmit the first ranging measurement frame a first Short Interframe Space (SIFS) after the announcement frame, to transmit the second ranging measurement frame a second SIFS after the first ranging measurement frame, and to transmit the location measurement report a third SIFS after the second ranging measurement frame.

Example 49 includes the subject matter of any one of Examples 38-48, and optionally, wherein the announcement frame comprises a Null Data Packet (NDP) Announcement (NDPA), the first ranging measurement frame comprises a first NDP, and the second ranging measurement frame comprises a second NDP.

Example 50 includes an apparatus of wireless communication by a Collaborative Time of Arrival (CToA) broadcasting wireless communication station (STA) (bSTA), the apparatus comprising means for broadcasting an announcement frame to announce a ranging-to-self sequence of a CToA measurement protocol; means for broadcasting a first ranging measurement frame of the ranging-to-self sequence subsequent to the announcement frame; means for broadcasting a second ranging measurement frame of the ranging-to-self sequence subsequent to the first ranging measurement frame; and means for broadcasting a Location Measurement Report (LMR) frame of the ranging-to-self sequence subsequent to the second ranging measurement frame, the LMR frame comprising a Time of Departure (ToD) of the first ranging measurement frame.

Example 51 includes the subject matter of Example 50, and optionally, wherein the announcement frame comprises a Receive Address (RA) field comprising an address of the bSTA.

Example 52 includes the subject matter of Example 50, and optionally, wherein the announcement frame comprises a Receive Address (RA) field comprising a same value as a Transmit Address (TA) field of the announcement frame.

Example 53 includes the subject matter of Example 50, and optionally, wherein the announcement frame comprises a Receive Address (RA) field comprising a broadcast address.

Example 54 includes the subject matter of Example 50, and optionally, wherein the announcement frame comprises a Receive Address (RA) field comprising a predefined value to indicate the ranging-to-self sequence.

Example 55 includes the subject matter of any one of Examples 50-54, and optionally, wherein the announcement frame comprises a predefined field to indicate the ranging-to-self sequence.

Example 56 includes the subject matter of any one of Examples 50-55, and optionally, wherein the announcement frame comprises a Frame-Control field to indicate the ranging-to-self sequence.

Example 57 includes the subject matter of any one of Examples 50-56, and optionally, wherein the LMR frame comprises measurement information comprising at least one of one or more ToD values or one or more Time of Arrival (ToA) values of previous measurements.

Example 58 includes the subject matter of any one of Examples 50-57, and optionally, wherein the LMR frame comprises scheduling information to schedule at least one subsequent ranging-to-self sequence.

Example 59 includes the subject matter of any one of Examples 50-58, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 60 includes the subject matter of any one of Examples 50-59, and optionally, comprising means for transmitting the first ranging measurement frame a first Short Interframe Space (SIFS) after the announcement frame, transmitting the second ranging measurement frame a second SIFS after the first ranging measurement frame, and transmitting the location measurement report a third SIFS after the second ranging measurement frame.

Example 61 includes the subject matter of any one of Examples 50-60, and optionally, wherein the announcement frame comprises a Null Data Packet (NDP) Announcement (NDPA), the first ranging measurement frame comprises a first NDP, and the second ranging measurement frame comprises a second NDP.

Example 62 includes an apparatus comprising logic and circuitry configured to cause a Collaborative Time of Arrival (CToA) wireless communication station (STA) to process an announcement frame from a CToA broadcasting wireless communication station (bSTA), the announcement frame to announce a ranging-to-self sequence from the bSTA; process a first ranging measurement frame of the ranging-to-self sequence from the bSTA subsequent to the announcement frame; process a second ranging measurement frame of the ranging-to-self sequence from the bSTA subsequent to the first ranging measurement frame; and process a Location Measurement Report (LMR) frame of the ranging-to-self sequence from the bSTA subsequent to the second ranging measurement frame, the LMR frame comprising a Time of Departure (ToD) of the first ranging measurement frame.

Example 63 includes the subject matter of Example 62, and optionally, wherein the apparatus is configured to cause the CToA STA to determine a Time of Arrival (ToA) of the first ranging measurement frame, and to determine a ranging measurement based on the ToD of the first ranging measurement frame and the ToA of the first ranging measurement frame.

Example 64 includes the subject matter of Example 62 or 63, and optionally, wherein the apparatus is configured to cause the CToA STA to determine a ToD of the second ranging measurement frame based on the ToD of the first ranging measurement frame and a Short Interframe Space (SIFS), to determine a ToA of the second ranging measurement frame, and to determine a ranging measurement based on the ToD of the second ranging measurement frame and the ToA of the second ranging measurement frame.

Example 65 includes the subject matter of any one of Examples 62-64, and optionally, wherein the announcement frame comprises a Receive Address (RA) field comprising an address of the bSTA.

Example 66 includes the subject matter of any one of Examples 62-64, and optionally, wherein the announcement frame comprises a Receive Address (RA) field comprising a same value as a Transmit Address (TA) field of the announcement frame.

Example 67 includes the subject matter of any one of Examples 62-64, and optionally, wherein the announcement frame comprises a Receive Address (RA) field comprising a broadcast address.

Example 68 includes the subject matter of any one of Examples 62-64, and optionally, wherein the announcement frame comprises a Receive Address (RA) field comprising a predefined value to indicate the ranging-to-self sequence.

Example 69 includes the subject matter of any one of Examples 62-68, and optionally, wherein the announcement frame comprises a predefined field to indicate the ranging-to-self sequence.

Example 70 includes the subject matter of any one of Examples 62-69, and optionally, wherein the announcement frame comprises a Frame-Control field to indicate the ranging-to-self sequence.

Example 71 includes the subject matter of any one of Examples 62-70, and optionally, wherein the LMR frame comprises measurement information comprising at least one of one or more ToD values or one or more Time of Arrival (ToA) values of previous measurements.

Example 72 includes the subject matter of any one of Examples 62-71, and optionally, wherein the LMR frame comprises scheduling information to schedule at least one subsequent ranging-to-self sequence from the bSTA.

Example 73 includes the subject matter of any one of Examples 62-72, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 74 includes the subject matter of any one of Examples 62-73, and optionally, wherein the first ranging measurement frame is a first Short Interframe Space (SIFS) after the announcement frame, the second ranging measurement frame is a second SIFS after the first ranging measurement frame, and the LMR frame is a third SIFS after the second ranging measurement frame.

Example 75 includes the subject matter of any one of Examples 62-74, and optionally, wherein the announcement frame comprises a Null data Packet (NDP) Announcement (NDPA), the first ranging measurement frame comprises a first NDP, and the second ranging measurement frame comprises a second NDP.

Example 76 includes the subject matter of any one of Examples 62-75, and optionally, wherein the CToA STA comprises a CToA client STA (cSTA) or another bSTA.

Example 77 includes the subject matter of any one of Examples 62-76, and optionally, comprising a memory, a processor, a radio, and one or more antennas.

Example 78 includes a system of wireless communication comprising a Collaborative Time of Arrival (CToA) wireless communication station (STA), the CToA STA comprising a radio; a memory; a processor; one or more antennas; and a controller configured to cause the CToA STA to process an announcement frame from a CToA broadcasting wireless communication station (bSTA), the announcement frame to announce a ranging-to-self sequence from the bSTA; process a first ranging measurement frame of the ranging-to-self sequence from the bSTA subsequent to the announcement frame; process a second ranging measurement frame of the ranging-to-self sequence from the bSTA subsequent to the first ranging measurement frame; and process a Location Measurement Report (LMR) frame of the ranging-to-self sequence from the bSTA subsequent to the second ranging measurement frame, the LMR frame comprising a Time of Departure (ToD) of the first ranging measurement frame.

Example 79 includes the subject matter of Example 78, and optionally, wherein the controller is configured to cause the CToA STA to determine a Time of Arrival (ToA) of the first ranging measurement frame, and to determine a ranging measurement based on the ToD of the first ranging measurement frame and the ToA of the first ranging measurement frame.

Example 80 includes the subject matter of Example 78 or 79, and optionally, wherein the controller is configured to cause the CToA STA to determine a ToD of the second ranging measurement frame based on the ToD of the first ranging measurement frame and a Short Interframe Space (SIFS), to determine a ToA of the second ranging measurement frame, and to determine a ranging measurement based on the ToD of the second ranging measurement frame and the ToA of the second ranging measurement frame.

Example 81 includes the subject matter of any one of Examples 78-80, and optionally, wherein the announcement frame comprises a Receive Address (RA) field comprising an address of the bSTA.

Example 82 includes the subject matter of any one of Examples 78-80, and optionally, wherein the announcement frame comprises a Receive Address (RA) field comprising a same value as a Transmit Address (TA) field of the announcement frame.

Example 83 includes the subject matter of any one of Examples 78-80, and optionally, wherein the announcement frame comprises a Receive Address (RA) field comprising a broadcast address.

Example 84 includes the subject matter of any one of Examples 78-80, and optionally, wherein the announcement frame comprises a Receive Address (RA) field comprising a predefined value to indicate the ranging-to-self sequence.

Example 85 includes the subject matter of any one of Examples 78-84, and optionally, wherein the announcement frame comprises a predefined field to indicate the ranging-to-self sequence.

Example 86 includes the subject matter of any one of Examples 78-85, and optionally, wherein the announcement frame comprises a Frame-Control field to indicate the ranging-to-self sequence.

Example 87 includes the subject matter of any one of Examples 78-86, and optionally, wherein the LMR frame comprises measurement information comprising at least one of one or more ToD values or one or more Time of Arrival (ToA) values of previous measurements.

Example 88 includes the subject matter of any one of Examples 78-87, and optionally, wherein the LMR frame comprises scheduling information to schedule at least one subsequent ranging-to-self sequence from the bSTA.

Example 89 includes the subject matter of any one of Examples 78-88, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 90 includes the subject matter of any one of Examples 78-89, and optionally, wherein the first ranging measurement frame is a first Short Interframe Space (SIFS) after the announcement frame, the second ranging measurement frame is a second SIFS after the first ranging measurement frame, and the LMR frame is a third SIFS after the second ranging measurement frame.

Example 91 includes the subject matter of any one of Examples 78-90, and optionally, wherein the announcement frame comprises a Null Data Packet (NDP) Announcement (NDPA), the first ranging measurement frame comprises a first NDP, and the second ranging measurement frame comprises a second NDP.

Example 92 includes the subject matter of any one of Examples 78-91, and optionally, wherein the CToA STA comprises a CToA client STA (cSTA) or another bSTA.

Example 93 includes a method to be performed at a Collaborative Time of Arrival (CToA) wireless communication station (STA), the method comprising processing an announcement frame from a CToA broadcasting wireless communication station (bSTA), the announcement frame to announce a ranging-to-self sequence from the bSTA; processing a first ranging measurement frame of the ranging-to-self sequence from the bSTA subsequent to the announcement frame; processing a second ranging measurement frame of the ranging-to-self sequence from the bSTA subsequent to the first ranging measurement frame; and processing a Location Measurement Report (LMR) frame of the ranging-to-self sequence from the bSTA subsequent to the second ranging measurement frame, the LMR frame comprising a Time of Departure (ToD) of the first ranging measurement frame.

Example 94 includes the subject matter of Example 93, and optionally, comprising determining a Time of Arrival (ToA) of the first ranging measurement frame, and determining a ranging measurement based on the ToD of the first ranging measurement frame and the ToA of the first ranging measurement frame.

Example 95 includes the subject matter of Example 93 or 94, and optionally, comprising determining a ToD of the second ranging measurement frame based on the ToD of the first ranging measurement frame and a Short Interframe Space (SIFS), determining a ToA of the second ranging measurement frame, and determining a ranging measurement based on the ToD of the second ranging measurement frame and the ToA of the second ranging measurement frame.

Example 96 includes the subject matter of any one of Examples 93-95, and optionally, wherein the announcement frame comprises a Receive Address (RA) field comprising an address of the bSTA.

Example 97 includes the subject matter of any one of Examples 93-95, and optionally, wherein the announcement frame comprises a Receive Address (RA) field comprising a same value as a Transmit Address (TA) field of the announcement frame.

Example 98 includes the subject matter of any one of Examples 93-95, and optionally, wherein the announcement frame comprises a Receive Address (RA) field comprising a broadcast address.

Example 99 includes the subject matter of any one of Examples 93-95, and optionally, wherein the announcement frame comprises a Receive Address (RA) field comprising a predefined value to indicate the ranging-to-self sequence.

Example 100 includes the subject matter of any one of Examples 93-99, and optionally, wherein the announcement frame comprises a predefined field to indicate the ranging-to-self sequence.

Example 101 includes the subject matter of any one of Examples 93-100, and optionally, wherein the announcement frame comprises a Frame-Control field to indicate the ranging-to-self sequence.

Example 102 includes the subject matter of any one of Examples 93-101, and optionally, wherein the LMR frame comprises measurement information comprising at least one of one or more ToD values or one or more Time of Arrival (ToA) values of previous measurements.

Example 103 includes the subject matter of any one of Examples 93-102, and optionally, wherein the LMR frame comprises scheduling information to schedule at least one subsequent ranging-to-self sequence from the bSTA.

Example 104 includes the subject matter of any one of Examples 93-103, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 105 includes the subject matter of any one of Examples 93-104, and optionally, wherein the first ranging measurement frame is a first Short Interframe Space (SIFS) after the announcement frame, the second ranging measurement frame is a second SIFS after the first ranging measurement frame, and the LMR frame is a third SIFS after the second ranging measurement frame.

Example 106 includes the subject matter of any one of Examples 93-105, and optionally, wherein the announcement frame comprises a Null Data Packet (NDP) Announcement (NDPA), the first ranging measurement frame comprises a first NDP, and the second ranging measurement frame comprises a second NDP.

Example 107 includes the subject matter of any one of Examples 93-106, and optionally, wherein the CToA STA comprises a CToA client STA (cSTA) or another bSTA.

Example 108 includes a product comprising one or more tangible computer-readable non-transitory storage media comprising computer-executable instructions operable to, when executed by at least one processor, enable the at least one processor to cause a Collaborative Time of Arrival (CToA) wireless communication station (STA) to process an announcement frame from a CToA broadcasting wireless communication station (bSTA), the announcement frame to announce a ranging-to-self sequence from the bSTA; process a first ranging measurement frame of the ranging-to-self sequence from the bSTA subsequent to the announcement frame; process a second ranging measurement frame of the ranging-to-self sequence from the bSTA subsequent to the first ranging measurement frame; and process a Location Measurement Report (LMR) frame of the ranging-to-self sequence from the bSTA subsequent to the second ranging measurement frame, the LMR frame comprising a Time of Departure (ToD) of the first ranging measurement frame.

Example 109 includes the subject matter of Example 108, and optionally, wherein the instructions, when executed, cause the CToA STA to determine a Time of Arrival (ToA) of the first ranging measurement frame, and to determine a ranging measurement based on the ToD of the first ranging measurement frame and the ToA of the first ranging measurement frame.

Example 110 includes the subject matter of Example 108 or 109, and optionally, wherein the instructions, when executed, cause the CToA STA to determine a ToD of the second ranging measurement frame based on the ToD of the first ranging measurement frame and a Short Interframe Space (SIFS), to determine a ToA of the second ranging measurement frame, and to determine a ranging measurement based on the ToD of the second ranging measurement frame and the ToA of the second ranging measurement frame.

Example 111 includes the subject matter of any one of Examples 108-110, and optionally, wherein the announcement frame comprises a Receive Address (RA) field comprising an address of the bSTA.

Example 112 includes the subject matter of any one of Examples 108-110, and optionally, wherein the announcement frame comprises a Receive Address (RA) field comprising a same value as a Transmit Address (TA) field of the announcement frame.

Example 113 includes the subject matter of any one of Examples 108-110, and optionally, wherein the announcement frame comprises a Receive Address (RA) field comprising a broadcast address.

Example 114 includes the subject matter of any one of Examples 108-110, and optionally, wherein the announcement frame comprises a Receive Address (RA) field comprising a predefined value to indicate the ranging-to-self sequence.

Example 115 includes the subject matter of any one of Examples 108-114, and optionally, wherein the announcement frame comprises a predefined field to indicate the ranging-to-self sequence.

Example 116 includes the subject matter of any one of Examples 108-115, and optionally, wherein the announcement frame comprises a Frame-Control field to indicate the ranging-to-self sequence.

Example 117 includes the subject matter of any one of Examples 108-116, and optionally, wherein the LMR frame comprises measurement information comprising at least one of one or more ToD values or one or more Time of Arrival (ToA) values of previous measurements.

Example 118 includes the subject matter of any one of Examples 108-117, and optionally, wherein the LMR frame comprises scheduling information to schedule at least one subsequent ranging-to-self sequence from the bSTA.

Example 119 includes the subject matter of any one of Examples 108-118, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 120 includes the subject matter of any one of Examples 108-119, and optionally, wherein the first ranging measurement frame is a first Short Interframe Space (SIFS) after the announcement frame, the second ranging measurement frame is a second SIFS after the first ranging measurement frame, and the LMR frame is a third SIFS after the second ranging measurement frame.

Example 121 includes the subject matter of any one of Examples 108-120, and optionally, wherein the announcement frame comprises a Null Data Packet (NDP) Announcement (NDPA), the first ranging measurement frame comprises a first NDP, and the second ranging measurement frame comprises a second NDP.

Example 122 includes the subject matter of any one of Examples 108-121, and optionally, wherein the CToA STA comprises a CToA client STA (cSTA) or another bSTA.

Example 123 includes an apparatus of wireless communication by a Collaborative Time of Arrival (CToA) wireless communication station (STA), the apparatus comprising means for processing an announcement frame from a CToA broadcasting wireless communication station (bSTA), the announcement frame to announce a ranging-to-self sequence from the bSTA; means for processing a first ranging measurement frame of the ranging-to-self sequence from the b STA subsequent to the announcement frame; means for processing a second ranging measurement frame of the ranging-to-self sequence from the bSTA subsequent to the first ranging measurement frame; and means for processing a Location Measurement Report (LMR) frame of the ranging-to-self sequence from the bSTA subsequent to the second ranging measurement frame, the LMR frame comprising a Time of Departure (ToD) of the first ranging measurement frame.

Example 124 includes the subject matter of Example 123, and optionally, comprising means for determining a Time of Arrival (ToA) of the first ranging measurement frame, and determining a ranging measurement based on the ToD of the first ranging measurement frame and the ToA of the first ranging measurement frame.

Example 125 includes the subject matter of Example 123 or 124, and optionally, comprising means for determining a ToD of the second ranging measurement frame based on the ToD of the first ranging measurement frame and a Short Interframe Space (SIFS), determining a ToA of the second ranging measurement frame, and determining a ranging measurement based on the ToD of the second ranging measurement frame and the ToA of the second ranging measurement frame.

Example 126 includes the subject matter of any one of Examples 123-125, and optionally, wherein the announcement frame comprises a Receive Address (RA) field comprising an address of the bSTA.

Example 127 includes the subject matter of any one of Examples 123-125, and optionally, wherein the announcement frame comprises a Receive Address (RA) field comprising a same value as a Transmit Address (TA) field of the announcement frame.

Example 128 includes the subject matter of any one of Examples 123-125, and optionally, wherein the announcement frame comprises a Receive Address (RA) field comprising a broadcast address.

Example 129 includes the subject matter of any one of Examples 123-125, and optionally, wherein the announcement frame comprises a Receive Address (RA) field comprising a predefined value to indicate the ranging-to-self sequence.

Example 130 includes the subject matter of any one of Examples 123-129, and optionally, wherein the announcement frame comprises a predefined field to indicate the ranging-to-self sequence.

Example 131 includes the subject matter of any one of Examples 123-130, and optionally, wherein the announcement frame comprises a Frame-Control field to indicate the ranging-to-self sequence.

Example 132 includes the subject matter of any one of Examples 123-131, and optionally, wherein the LMR frame comprises measurement information comprising at least one of one or more ToD values or one or more Time of Arrival (ToA) values of previous measurements.

Example 133 includes the subject matter of any one of Examples 123-132, and optionally, wherein the LMR frame comprises scheduling information to schedule at least one subsequent ranging-to-self sequence from the bSTA.

Example 134 includes the subject matter of any one of Examples 123-133, and optionally, wherein the ranging-to-self sequence is in compliance with a frame format of a Very-High-Throughput (VHT) Task Group az (TGaz) (VHTz) Single-User (SU) ranging measurement, the announcement frame is in compliance with a frame format of a VHTz announcement frame, and the first ranging measurement frame is in compliance with a frame format of a VHTz ranging measurement frame.

Example 135 includes the subject matter of any one of Examples 123-134, and optionally, wherein the first ranging measurement frame is a first Short Interframe Space (SIFS) after the announcement frame, the second ranging measurement frame is a second SIFS after the first ranging measurement frame, and the LMR frame is a third SIFS after the second ranging measurement frame.

Example 136 includes the subject matter of any one of Examples 123-135, and optionally, wherein the announcement frame comprises a Null Data Packet (NDP) Announcement (NDPA), the first ranging measurement frame comprises a first NDP, and the second ranging measurement frame comprises a second NDP.

Example 137 includes the subject matter of any one of Examples 123-136, and optionally, wherein the CToA STA comprises a CToA client STA (cSTA) or another bSTA.

Example 138 includes an apparatus comprising logic and circuitry configured to cause a Collaborative Time of Arrival (CToA) broadcasting wireless communication station (STA) (bSTA) to broadcast a Very High Throughput (VHT) Null Data Packet (NDP) Announcement (NDPA) to announce a transmission of a VHT NDP over a channel bandwidth comprising a plurality of channels, the VHT NDP configured for a ranging measurement; and broadcast the transmission of the VHT NDP over the channel bandwidth by duplicating a plurality of NDP fields of the VHT NDP over the plurality of channels, the plurality of NDP fields comprising a first plurality of Non-High-Throughput (non-HT) fields and a second plurality of VHT fields configured for the ranging measurement.

Example 139 includes the subject matter of Example 138, and optionally, wherein the apparatus is configured to cause the bSTA to broadcast the transmission of the VHT NDP over a 40 Megahertz (MHz) channel bandwidth comprising two adjacent 20 MHZ channels by duplicating the plurality of NDP fields over the two adjacent 20 MHZ channels.

Example 140 includes the subject matter of Example 138, and optionally, wherein the apparatus is configured to cause the bSTA to broadcast the transmission of the VHT NDP over an 80 Megahertz (MHz) channel bandwidth comprising four adjacent 20 MHZ channels by duplicating the plurality of NDP fields over the four adjacent 20 MHZ channels.

Example 141 includes the subject matter of Example 138, and optionally, wherein the apparatus is configured to cause the bSTA to broadcast the transmission of the VHT NDP over a 160 Megahertz (MHz) channel bandwidth comprising eight adjacent 20 MHZ channels by duplicating the plurality of NDP fields over the eight adjacent 20 MHZ channels.

Example 142 includes the subject matter of Example 138, and optionally, wherein the apparatus is configured to cause the bSTA to broadcast the transmission of the VHT NDP over a 80+80 Megahertz (MHz) channel bandwidth comprising first and second non-adjacent 80 MHZ channels by duplicating the plurality of NDP fields over first four adjacent 20 MHZ channels in the first 80 MHz channel and over second four adjacent 20 MHZ channels in the second 80 MHz channel.

Example 143 includes the subject matter of any one of Examples 138-142, and optionally, wherein the apparatus is configured to cause the bSTA to broadcast a VHT Long Training Field (LTF) of the second plurality of VHT fields over the plurality of channels by broadcasting a sequence of a plurality of duplicates of the VHT LTF over the plurality of channels, respectively.

Example 144 includes the subject matter of any one of Examples 138-143, and optionally, wherein the second plurality of VHT fields comprises at least one angular measurement field configured for an angular measurement, the apparatus configured to cause the bSTA to broadcast over each channel of the plurality of channels a plurality of duplicates of the angular measurement field.

Example 145 includes the subject matter of any one of Examples 138-144, and optionally, wherein the first plurality of non-HT fields comprises at least one of a non-HT Short Training Field (STF) (L-STF), a non-HT Long Training Field (LTF) (L-LTF), or a non-HT Signal (L-SIG) field.

Example 146 includes the subject matter of any one of Examples 138-145, and optionally, wherein the second plurality of VHT fields comprises at least one of a VHT Signal A field (VHT-SIG-A), a VHT Short Training Field (STF) (VHT-STF), a VHT Long Training Field (LTF) (VHT-LTF), or a VHT Signal B Field (VHT-SIG-B).

Example 147 includes the subject matter of any one of Examples 138-146, and optionally, wherein the ranging measurement comprises at least one of a Time of Arrival (ToA) measurement or an angle of Departure (AoD) measurement.

Example 148 includes the subject matter of any one of Examples 138-147, and optionally, wherein the bSTA comprises an Access Point (AP) STA.

Example 149 includes the subject matter of any one of Examples 138-148, and optionally, comprising a memory, a processor, a radio, and one or more antennas.

Example 150 includes a system of wireless communication comprising a Collaborative Time of Arrival (CToA) broadcasting wireless communication station (STA) (bSTA), the bSTA comprising a radio; a memory; a processor; one or more antennas; and a controller configured to cause the bSTA to broadcast a Very High Throughput (VHT) Null Data Packet (NDP) Announcement (NDPA) to announce a transmission of a VHT NDP over a channel bandwidth comprising a plurality of channels, the VHT NDP configured for a ranging measurement; and broadcast the transmission of the VHT NDP over the channel bandwidth by duplicating a plurality of NDP fields of the VHT NDP over the plurality of channels, the plurality of NDP fields comprising a first plurality of Non-High-Throughput (non-HT) fields and a second plurality of VHT fields configured for the ranging measurement.

Example 151 includes the subject matter of Example 150, and optionally, wherein the controller is configured to cause the bSTA to broadcast the transmission of the VHT NDP over a 40 Megahertz (MHz) channel bandwidth comprising two adjacent 20 MHZ channels by duplicating the plurality of NDP fields over the two adjacent 20 MHZ channels.

Example 152 includes the subject matter of Example 150, and optionally, wherein the controller is configured to cause the bSTA to broadcast the transmission of the VHT NDP over an 80 Megahertz (MHz) channel bandwidth comprising four adjacent 20 MHZ channels by duplicating the plurality of NDP fields over the four adjacent 20 MHZ channels.

Example 153 includes the subject matter of Example 150, and optionally, wherein the controller is configured to cause the bSTA to broadcast the transmission of the VHT NDP over a 160 Megahertz (MHz) channel bandwidth comprising eight adjacent 20 MHZ channels by duplicating the plurality of NDP fields over the eight adjacent 20 MHZ channels.

Example 154 includes the subject matter of Example 150, and optionally, wherein the controller is configured to cause the bSTA to broadcast the transmission of the VHT NDP over a 80+80 Megahertz (MHz) channel bandwidth comprising first and second non-adjacent 80 MHZ channels by duplicating the plurality of NDP fields over first four adjacent 20 MHZ channels in the first 80 MHz channel and over second four adjacent 20 MHZ channels in the second 80 MHz channel.

Example 155 includes the subject matter of any one of Examples 150-154, and optionally, wherein the controller is configured to cause the bSTA to broadcast a VHT Long Training Field (LTF) of the second plurality of VHT fields over the plurality of channels by broadcasting a sequence of a plurality of duplicates of the VHT LTF over the plurality of channels, respectively.

Example 156 includes the subject matter of any one of Examples 150-155, and optionally, wherein the second plurality of VHT fields comprises at least one angular measurement field configured for an angular measurement, the controller is configured to cause the bSTA to broadcast over each channel of the plurality of channels a plurality of duplicates of the angular measurement field.

Example 157 includes the subject matter of any one of Examples 150-156, and optionally, wherein the first plurality of non-HT fields comprises at least one of a non-HT Short Training Field (STF) (L-STF), a non-HT Long Training Field (LTF) (L-LTF), or a non-HT Signal (L-SIG) field.

Example 158 includes the subject matter of any one of Examples 150-157, and optionally, wherein the second plurality of VHT fields comprises at least one of a VHT Signal A field (VHT-SIG-A), a VHT Short Training Field (STF) (VHT-STF), a VHT Long Training Field (LTF) (VHT-LTF), or a VHT Signal B Field (VHT-SIG-B).

Example 159 includes the subject matter of any one of Examples 150-158, and optionally, wherein the ranging measurement comprises at least one of a Time of Arrival (ToA) measurement or an angle of Departure (AoD) measurement.

Example 160 includes the subject matter of any one of Examples 150-159, and optionally, wherein the bSTA comprises an Access Point (AP) STA.

Example 161 includes a method to be performed at a Collaborative Time of Arrival (CToA) broadcasting wireless communication station (STA) (bSTA), the method comprising broadcasting a Very High Throughput (VHT) Null Data Packet (NDP) Announcement (NDPA) to announce a transmission of a VHT NDP over a channel bandwidth comprising a plurality of channels, the VHT NDP configured for a ranging measurement; and broadcasting the transmission of the VHT NDP over the channel bandwidth by duplicating a plurality of NDP fields of the VHT NDP over the plurality of channels, the plurality of NDP fields comprising a first plurality of Non-High-Throughput (non-HT) fields and a second plurality of VHT fields configured for the ranging measurement.

Example 162 includes the subject matter of Example 161, and optionally, comprising broadcasting the transmission of the VHT NDP over a 40 Megahertz (MHz) channel bandwidth comprising two adjacent 20 MHZ channels by duplicating the plurality of NDP fields over the two adjacent 20 MHZ channels.

Example 163 includes the subject matter of Example 161, and optionally, comprising broadcasting the transmission of the VHT NDP over an 80 Megahertz (MHz) channel bandwidth comprising four adjacent 20 MHZ channels by duplicating the plurality of NDP fields over the four adjacent 20 MHZ channels.

Example 164 includes the subject matter of Example 161, and optionally, comprising broadcasting the transmission of the VHT NDP over a 160 Megahertz (MHz) channel bandwidth comprising eight adjacent 20 MHZ channels by duplicating the plurality of NDP fields over the eight adjacent 20 MHZ channels.

Example 165 includes the subject matter of Example 161, and optionally, comprising broadcasting the transmission of the VHT NDP over a 80+80 Megahertz (MHz) channel bandwidth comprising first and second non-adjacent 80 MHZ channels by duplicating the plurality of NDP fields over first four adjacent 20 MHZ channels in the first 80 MHz channel and over second four adjacent 20 MHZ channels in the second 80 MHz channel.

Example 166 includes the subject matter of any one of Examples 161-165, and optionally, comprising broadcasting a VHT Long Training Field (LTF) of the second plurality of VHT fields over the plurality of channels by broadcasting a sequence of a plurality of duplicates of the VHT LTF over the plurality of channels, respectively.

Example 167 includes the subject matter of any one of Examples 161-166, and optionally, wherein the second plurality of VHT fields comprises at least one angular measurement field configured for an angular measurement, the method comprising broadcasting over each channel of the plurality of channels a plurality of duplicates of the angular measurement field.

Example 168 includes the subject matter of any one of Examples 161-167, and optionally, wherein the first plurality of non-HT fields comprises at least one of a non-HT Short Training Field (STF) (L-STF), a non-HT Long Training Field (LTF) (L-LTF), or a non-HT Signal (L-SIG) field.

Example 169 includes the subject matter of any one of Examples 161-168, and optionally, wherein the second plurality of VHT fields comprises at least one of a VHT Signal A field (VHT-SIG-A), a VHT Short Training Field (STF) (VHT-STF), a VHT Long Training Field (LTF) (VHT-LTF), or a VHT Signal B Field (VHT-SIG-B).

Example 170 includes the subject matter of any one of Examples 161-169, and optionally, wherein the ranging measurement comprises at least one of a Time of Arrival (ToA) measurement or an angle of Departure (AoD) measurement.

Example 171 includes the subject matter of any one of Examples 161-170, and optionally, wherein the bSTA comprises an Access Point (AP) STA.

Example 172 includes a product comprising one or more tangible computer-readable non-transitory storage media comprising computer-executable instructions operable to, when executed by at least one processor, enable the at least one processor to cause a Collaborative Time of Arrival (CToA) broadcasting wireless communication station (STA) (bSTA) to broadcast a Very High Throughput (VHT) Null Data Packet (NDP) Announcement (NDPA) to announce a transmission of a VHT NDP over a channel bandwidth comprising a plurality of channels, the VHT NDP configured for a ranging measurement; and broadcast the transmission of the VHT NDP over the channel bandwidth by duplicating a plurality of NDP fields of the VHT NDP over the plurality of channels, the plurality of NDP fields comprising a first plurality of Non-High-Throughput (non-HT) fields and a second plurality of VHT fields configured for the ranging measurement.

Example 173 includes the subject matter of Example 172, and optionally, wherein the instructions, when executed, cause the bSTA to broadcast the transmission of the VHT NDP over a 40 Megahertz (MHz) channel bandwidth comprising two adjacent 20 MHZ channels by duplicating the plurality of NDP fields over the two adjacent 20 MHZ channels.

Example 174 includes the subject matter of Example 172, and optionally, wherein the instructions, when executed, cause the bSTA to broadcast the transmission of the VHT NDP over an 80 Megahertz (MHz) channel bandwidth comprising four adjacent 20 MHZ channels by duplicating the plurality of NDP fields over the four adjacent 20 MHZ channels.

Example 175 includes the subject matter of Example 172, and optionally, wherein the instructions, when executed, cause the bSTA to broadcast the transmission of the VHT NDP over a 160 Megahertz (MHz) channel bandwidth comprising eight adjacent 20 MHZ channels by duplicating the plurality of NDP fields over the eight adjacent 20 MHZ channels.

Example 176 includes the subject matter of Example 172, and optionally, wherein the instructions, when executed, cause the bSTA to broadcast the transmission of the VHT NDP over a 80+80 Megahertz (MHz) channel bandwidth comprising first and second non-adjacent 80 MHZ channels by duplicating the plurality of NDP fields over first four adjacent 20 MHZ channels in the first 80 MHz channel and over second four adjacent 20 MHZ channels in the second 80 MHz channel.

Example 177 includes the subject matter of any one of Examples 172-176, and optionally, wherein the instructions, when executed, cause the bSTA to broadcast a VHT Long Training Field (LTF) of the second plurality of VHT fields over the plurality of channels by broadcasting a sequence of a plurality of duplicates of the VHT LTF over the plurality of channels, respectively.

Example 178 includes the subject matter of any one of Examples 172-177, and optionally, wherein the second plurality of VHT fields comprises at least one angular measurement field configured for an angular measurement, the instructions, when executed, cause the bSTA to broadcast over each channel of the plurality of channels a plurality of duplicates of the angular measurement field.

Example 179 includes the subject matter of any one of Examples 172-178, and optionally, wherein the first plurality of non-HT fields comprises at least one of a non-HT Short Training Field (STF) (L-STF), a non-HT Long Training Field (LTF) (L-LTF), or a non-HT Signal (L-SIG) field.

Example 180 includes the subject matter of any one of Examples 172-179, and optionally, wherein the second plurality of VHT fields comprises at least one of a VHT Signal A field (VHT-SIG-A), a VHT Short Training Field (STF) (VHT-STF), a VHT Long Training Field (LTF) (VHT-LTF), or a VHT Signal B Field (VHT-SIG-B).

Example 181 includes the subject matter of any one of Examples 172-180, and optionally, wherein the ranging measurement comprises at least one of a Time of Arrival (ToA) measurement or an angle of Departure (AoD) measurement.

Example 182 includes the subject matter of any one of Examples 172-181, and optionally, wherein the bSTA comprises an Access Point (AP) STA.

Example 183 includes an apparatus of wireless communication by a Collaborative Time of Arrival (CToA) broadcasting wireless communication station (STA) (bSTA), the apparatus comprising means for broadcasting a Very High Throughput (VHT) Null Data Packet (NDP) Announcement (NDPA) to announce a transmission of a VHT NDP over a channel bandwidth comprising a plurality of channels, the VHT NDP configured for a ranging measurement; and means for broadcasting the transmission of the VHT NDP over the channel bandwidth by duplicating a plurality of NDP fields of the VHT NDP over the plurality of channels, the plurality of NDP fields comprising a first plurality of Non-High-Throughput (non-HT) fields and a second plurality of VHT fields configured for the ranging measurement.

Example 184 includes the subject matter of Example 183, and optionally, comprising means for broadcasting the transmission of the VHT NDP over a 40 Megahertz (MHz) channel bandwidth comprising two adjacent 20 MHZ channels by duplicating the plurality of NDP fields over the two adjacent 20 MHZ channels.

Example 185 includes the subject matter of Example 183, and optionally, comprising means for broadcasting the transmission of the VHT NDP over an 80 Megahertz (MHz) channel bandwidth comprising four adjacent 20 MHZ channels by duplicating the plurality of NDP fields over the four adjacent 20 MHZ channels.

Example 186 includes the subject matter of Example 183, and optionally, comprising means for broadcasting the transmission of the VHT NDP over a 160 Megahertz (MHz) channel bandwidth comprising eight adjacent 20 MHZ channels by duplicating the plurality of NDP fields over the eight adjacent 20 MHZ channels.

Example 187 includes the subject matter of Example 183, and optionally, comprising means for broadcasting the transmission of the VHT NDP over a 80+80 Megahertz (MHz) channel bandwidth comprising first and second non-adjacent 80 MHZ channels by duplicating the plurality of NDP fields over first four adjacent 20 MHZ channels in the first 80 MHz channel and over second four adjacent 20 MHZ channels in the second 80 MHz channel.

Example 188 includes the subject matter of any one of Examples 183-187, and optionally, comprising means for broadcasting a VHT Long Training Field (LTF) of the second plurality of VHT fields over the plurality of channels by broadcasting a sequence of a plurality of duplicates of the VHT LTF over the plurality of channels, respectively.

Example 189 includes the subject matter of any one of Examples 183-188, and optionally, wherein the second plurality of VHT fields comprises at least one angular measurement field configured for an angular measurement, the apparatus comprising means for broadcasting over each channel of the plurality of channels a plurality of duplicates of the angular measurement field.

Example 190 includes the subject matter of any one of Examples 183-189, and optionally, wherein the first plurality of non-HT fields comprises at least one of a non-HT Short Training Field (STF) (L-STF), a non-HT Long Training Field (LTF) (L-LTF), or a non-HT Signal (L-SIG) field.

Example 191 includes the subject matter of any one of Examples 183-190, and optionally, wherein the second plurality of VHT fields comprises at least one of a VHT Signal A field (VHT-SIG-A), a VHT Short Training Field (STF) (VHT-STF), a VHT Long Training Field (LTF) (VHT-LTF), or a VHT Signal B Field (VHT-SIG-B).

Example 192 includes the subject matter of any one of Examples 183-191, and optionally, wherein the ranging measurement comprises at least one of a Time of Arrival (ToA) measurement or an angle of Departure (AoD) measurement.

Example 193 includes the subject matter of any one of Examples 183-192, and optionally, wherein the bSTA comprises an Access Point (AP) STA.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a Collaborative Time of Arrival (CToA) broadcasting wireless communication station (STA) (bSTA) to:
broadcast from the CToA bSTA an announcement frame to announce a ranging-to-self sequence of a CToA measurement protocol, wherein the ranging-to-self sequence comprises a first ranging measurement frame, a second ranging measurement frame, and a Location Measurement Report (LMR) frame, to be broadcasted from the CToA bSTA;

broadcast from the CToA bSTA the first ranging measurement frame of the ranging-to-self sequence a first Short Interframe Space (SIFS) after the announcement frame;

broadcast from the CToA bSTA the second ranging measurement frame of the ranging-to-self sequence a second SIFS after the first ranging measurement frame; and broadcast from the CToA bSTA the LMR frame of the ranging-to-self sequence a third SIFS after the second ranging measurement frame, the LMR frame comprising a Time of Departure (ToD) of the first ranging measurement frame.

2. The apparatus of claim 1, wherein the announcement frame comprises a Receive Address (RA) field comprising an address of the CToA bSTA.

3. The apparatus of claim 1, wherein the announcement frame comprises a Receive Address (RA) field comprising a same value as a Transmit Address (TA) field of the announcement frame.

4. The apparatus of claim 1, wherein the announcement frame comprises a Receive Address (RA) field comprising a broadcast address.

5. The apparatus of claim 1, wherein the announcement frame comprises a Receive Address (RA) field comprising a predefined value to indicate the ranging-to-self sequence.

6. The apparatus of claim 1, wherein the announcement frame comprises a predefined field to indicate the ranging-to-self sequence.

7. The apparatus of claim 1, wherein the announcement frame comprises a Frame-Control field to indicate the ranging-to-self sequence.

8. The apparatus of claim 1, wherein the LMR frame comprises measurement information comprising at least one of one or more ToD values or one or more Time of Arrival (ToA) values of previous measurements.

9. The apparatus of claim 1, wherein the LMR frame comprises scheduling information to schedule at least one subsequent ranging-to-self sequence.

10. The apparatus of claim 1, wherein the ranging-to-self sequence is in compliance with a frame format of a Very-High-Throughput (VHT) Single-User (SU) ranging measurement, the announcement frame is in compliance with a frame format of a VHT announcement frame, and the first ranging measurement frame is in compliance with a frame format of a VHT ranging measurement frame.

11. The apparatus of claim 1, wherein the announcement frame comprises a Null Data Packet (NDP) Announcement (NDPA), the first ranging measurement frame comprises a first NDP, and the second ranging measurement frame comprises a second NDP.

12. The apparatus of claim 1 comprising a memory, a processor, a radio, and one or more antennas.

* * * * *